United States Patent
Mitamura

[11] Patent Number: 5,908,986
[45] Date of Patent: Jun. 1, 1999

[54] ANGULAR VELOCITY SENSOR

[75] Inventor: Takeshi Mitamura, Kanagawa-ken, Japan

[73] Assignee: Nissan Motor Co., Ltd., Kanagawa-ken, Japan

[21] Appl. No.: 08/811,464

[22] Filed: Mar. 3, 1997

[30] Foreign Application Priority Data

Mar. 1, 1996 [JP] Japan .................................. 8-045035

[51] Int. Cl.⁶ .................................. G01P 3/44; G01P 9/00
[52] U.S. Cl. ............................................ 73/504.12
[58] Field of Search ........................... 73/504.12, 504.02, 73/504.03, 504.04, 514.32, DIG. 1, 1.37, 511; 361/280

[56] References Cited

U.S. PATENT DOCUMENTS

| | | | |
|---|---|---|---|
| 5,359,893 | 11/1994 | Dunn ..................................... | 73/504.12 |
| 5,600,065 | 2/1997 | Kar et al. .............................. | 73/504.12 |
| 5,635,638 | 6/1997 | Geen ..................................... | 73/504.04 |
| 5,734,105 | 3/1998 | Mizukoshi ............................. | 73/504.02 |

FOREIGN PATENT DOCUMENTS 5-248872 9/1993 Japan .
5-312576 11/1993 Japan .

OTHER PUBLICATIONS

Bernstein, J., et al: "A Micromachined Comb–Drive Tuning Fork Rate Gyroscope", *IEEE*, 1993, pp. 143–148.

*Primary Examiner*—Hezron Williams
*Assistant Examiner*—Richard A. Moller
*Attorney, Agent, or Firm*—McDermott, Will & Emery

[57] ABSTRACT

An angular velocity sensor comprises a silicon substrate, a vibration mass formed separate from the silicon substrate on a principal surface of the silicon substrate to vibrate in directions along first and second orthogonal axes, supporting portions for supporting the vibration mass and positioned symmetrically with respect to the first axis and the second axis and having equal spring constants in directions along the first and second axes, drive electrodes and driving means for driving the vibration mass in the direction along the first axis, and detection electrodes and detecting means for detecting displacement of the vibration mass in the direction along the second axis. The drive and/or detection electrodes of the angular velocity sensor are split into a plurality of capacitors which permit a plurality of voltage values to be applied to capacitors. Accordingly, when the vibration mass is rotated around a third axis perpendicular to the principal surface of the substrate while vibrating in the direction along the first axis, an angular velocity around the third axis can be measured by detecting a Coriolis force generated in the direction along the second axis.

31 Claims, 27 Drawing Sheets

L-SIDE    R-SIDE

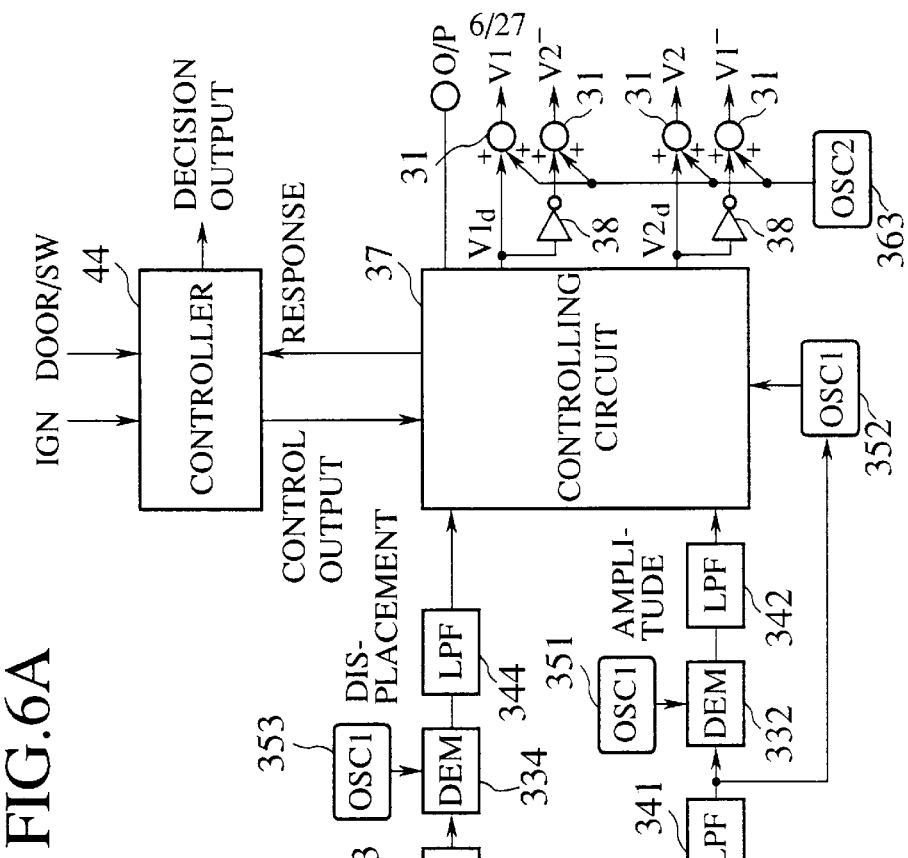
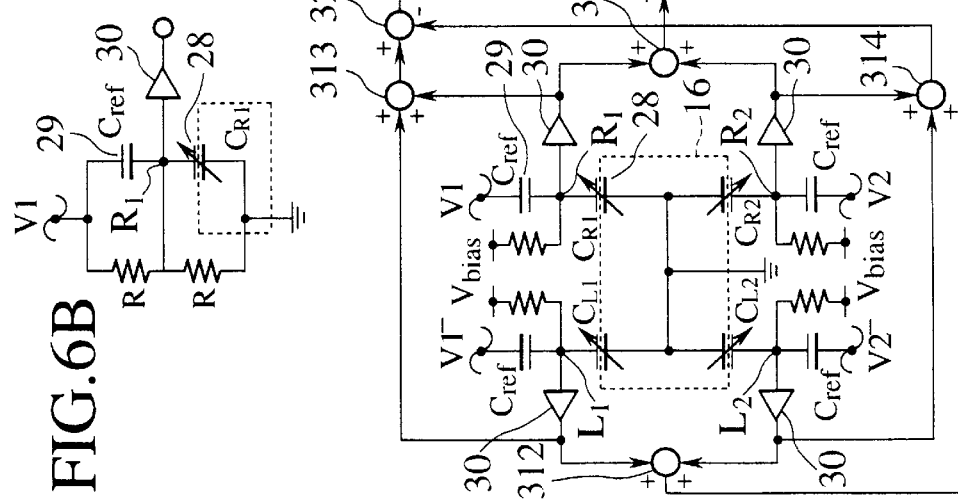
FIG.6A
FIG.6B

ANGULAR VELOCITY SENSOR

BACKGROUND OF THE INVENTION

1. Field of the Invention

The present invention relates an angular velocity sensor (an angular rate sensor) for detecting a Coriolis force of a vibration mass generated in a direction perpendicular to a driving direction and detecting an angular velocity of rotating motion of a vibration mass if the rotating motion is applied to the vibration mass.

2. Description of the Prior Art

As an angular velocity sensor using semiconductor manufacturing technology, a technology disclosed in Patent application Publication (KOKAI) No. 5-312576 has been known. In this angular velocity sensor, an oxide film is formed on a first silicon substrate, then the oxide film is patterned, then a second silicon substrate is bonded to the first silicon substrate via the oxide film with the use of a silicon direct bonding (SDB) method. Then the second silicon substrate in the SDB structure is polished up to a predetermined thickness, and then the second silicon substrate is etched to form grooves having vertical side walls. The vibration mass, first and second supporting portions, and frame portions of the angular velocity sensor are patterned by using the grooves. Almost whole peripheral side surfaces of the vibration mass are isolated by the side walls of the grooves, but parts of the vibration mass are supported by the first supporting portions. The first supporting portions (on the opposite side to the connection portions to the vibration mass) are connected to the frame portion which is separated from the vibration mass by the grooves. The frame portion is supported by the second supporting portions. Comb electrodes, or the interdigital capacities for driving the vibration mass by an electrostatic force in the x axis direction to vibrate are constituted at a predetermined position of the frame portion. In order to detect displacement of the vibration mass due to the Coriolis force, piezo resistance bridges are formed around the connection portions between the first supporting portions and the frame portion. In addition, detection electrodes are formed in the grooves between the vibration mass and the frame portion. Thus the angular velocity sensor in Patent application Publication (KOKAI) No. 5-312576 (referred to as a "first conventional example") is constituted. Since the vibration mass is formed of a single crystal semiconductor thin film, mass m of the vibration mass is small. Therefore, the Coriolis force generated is slight, and it cannot be measured actually by the resistance bridge consisting of the piezo resistances. For this reason, displacement of the vibration mass must be measured according to change in electrostatic capacitance of a capacitor, i.e., a pair of detection electrodes between the vibration mass and the frame portion. However, because the detection electrodes are formed on surfaces of side walls of the vibration mass and the frame portion, opposing areas of the simple parallel plate capacitor are small so that electrostatic capacitance values cannot be assured. As a result, there has been caused a problem that an S/N ratio cannot be sufficiently assured in measuring displacement of the vibration mass. In addition, there has been another problem that it is difficult to assure sufficient opposing areas in the comb electrodes to drive the vibration mass, so that sufficient vibration amplitude cannot be achieved.

In the first conventional example, there has been still another problem that miniaturization of the supporting portion and the drive electrodes become difficult since electrical connections between piezo resistances or detection electrodes and the comb electrodes via the supporting portions are needed and also electrical isolation therebetween are needed.

In the first conventional example, there has been yet still another problem that, if the electric connection is made by metal such as aluminum, since difference in thermal expansion coefficient is large between the metal connection and the supporting portions such as a silicon and an insulating film, it is likely to cause an offset in the output of the angular velocity sensor because of bowing of the structural body generated by thermal stress. And also it is likely to cause plastic deformation of the metal portion because of significant deformation of the supporting portions. Hence, deterioration of the output of the angular velocity sensor will be caused with elapsed time.

In the meanwhile, as another conventional example, there has been known an angular velocity sensor which is disclosed in, for example, J. Bernstein et al. "Micromachined Comb-Drive Tuning Fork Rate Gyroscope" Digest IEEE/ASME Micro Electro Mechanical Systems (MEMS) Workshop, Florida, 1993, 143–148 (referred to as a "second conventional example"). In the second conventional example, all the structural bodies are formed of polysilicon thin film stacked on a silicon substrate. In other words, the vibration mass, the supporting portions for supporting the vibration mass on the silicon substrate, the comb electrodes, and the drive electrodes constituted by the comb electrodes fixed to the silicon substrate are patterned to be separated by grooves formed in the polysilicon thin film. The angular velocity sensor is so formed that the oxide film is formed on the silicon substrate and the vibration mass is disposed on the oxide film. The vibration mass is separated from the oxide film and the detection electrodes are formed on the oxide film and directly below the vibration mass.

In the angular velocity sensor of the second conventional example, detection of the angular velocity is carried out in such a manner that vibration due to the Coriolis force generated along the detection axis direction is detected in a vibration state of the vibration mass which is driven along the drive axis direction. Accordingly, abnormality to disturb the operation of the vibration mass can be immediately detected by monitoring vibration amplitude along the drive axis direction. However, in the event that the vibration mass can vibrate at a predetermined amplitude along the drive axis direction whereas vibration of the vibration mass exceeding a predetermined amplitude is prevented along the detection axis direction due to enter of movable dust between the vibration mass and the substrate, it is difficult to detect an abnormal state easily by the conventional vibration gyroscope. Further, even if the movable dust disturbing the vibration of the vibration mass exists very near the vibration ranges of the vibration mass along other two orthogonal axis perpendicular to the detection axis, there exists the possibility that a failure of the angular velocity sensor is caused.

SUMMARY OF THE INVENTION

In view of the above problems, it is a first object of the present invention to provide a compact and light angular velocity sensor capable of obtaining precise detection results with a high mass-producibility.

It is a second object of the present invention to provide an angular velocity sensor capable of improving rigidity of comb electrodes fixed to a substrate. The second object of the present invention also lies in preventing damage of the comb electrodes from a large-scale input such as impact caused by falling down of the angular velocity sensor, by limiting displacement of a vibration mass along a normal direction to the substrate, whereby achieving high reliability of the angular velocity sensor.

It is a third object of the present invention to provide a new self-diagnosis method of an angular velocity sensor. For example, the angular velocity sensor installed in a vehicle is capable of executing self-diagnosis when the vehicle is being stopped, thus detecting failure due to entering of movable dust, etc., beforehand, and issuing a warning to a driver.

In order to achieve the above objects, according to a first aspect of the present invention, there is provided an angular velocity sensor comprising a substrate; a vibration mass positioned separate from the substrate in such a manner that the vibration mass is made possible to vibrate at least in a direction parallel to a principal surface of the substrate; at least two plate-like supporting portions positioned symmetrically with respect to a direction bisecting an angle between a first axis and a second axis both constituting an orthogonal coordinate system on a surface which is parallel to the principal surface of the substrate and includes the first axis and the second axis. And one end of each of the at least two plate-like supporting portions being fixed to the vibration mass and other end thereof being fixed to the substrate. The angular velocity sensor further comprising drive electrodes and driving means for driving the vibration mass in a first axis (drive axis) direction to vibrate; and detection electrodes (or sense electrodes) and detecting means for detecting displacement of the vibration mass in a second axis (sense axis) direction. The respective drive electrode is formed as a capacitor, comprising a pair of opposing electrodes such as a vibration drive electrode fixed to the vibration mass and a stationary drive electrode fixed to the substrate. The respective detection electrode is formed as a capacitor, comprising a pair of opposing electrodes such as a vibration detection electrode and a stationary detection electrode. The vibration detection electrode is fixed to the vibration mass and the stationary detection electrode is fixed to the substrate. According to the first aspect of the present invention, it is preferable that the drive electrodes are split into plural electrode pairs to enable plural voltage values to be applied thereon. By splitting the drive electrodes into plural electrode pairs, these electrode pairs can be employed as detection electrodes, simultaneously. If the vibration mass is rotated around a third axis along the direction perpendicular to a principal surface of the substrate while it is driven along the first axis (drive axis) direction to vibrate, an angular velocity of the rotating motion around the third axis can be measured by detecting the Coriolis force FC generated along the second axis (detection axis) direction. The first, second, and third axes belong to the orthogonal coordinate system, and the first and second axes are parallel with the principal surface of the substrate. The "predetermined direction" means a direction to bisect an angle between the first axis and the second axis, as shown by a broken line in FIG. 3A.

The vibration mass may be driven to vibrate by the electrostatic attractive force, etc. with the use of the drive electrodes constituting capacitors. For purposes of example, if the vibration mass is driven in the first axis (x axis) direction parallel with the substrate surface to vibrate and a vibration system composed of the vibration mass and the supporting portions is rotated around the third axis (z axis direction) at an angular velocity $\Omega$, the Coriolis force $F_c$ is generated on the vibration mass along the second axis (y axis) direction. As well known, the Coriolis force $F_c$ generated on the vibration mass can be expressed as $$F_c(t) \approx 2 \cdot m \cdot V_m(t) \cdot \Omega \qquad (1)$$

Where m is a mass of the vibration mass and $V_m(t)$ is a velocity of the vibration mass driven by the electrostatic attractive force, etc.

In the first aspect of the present invention, a term "plate-like supporting portions" means a structure having substantially a uniform thickness like a flat plate, or a slab. Although examples of plan views of the plate-like supporting portions are shown in FIGS. 3B to 3E, FIGS. 4A to 4C, FIGS. 5A and 5B, upper surfaces and lower surfaces of the plate-like supporting portions are substantially parallel to each other to have a constant thickness in the sectional views. If the plate-like supporting portions are used, i.e., a thickness of the plate is set to be constant, the elastic characteristics of the supporting portions are determined depending upon plan shapes of the plate material (supporting portions) after the supporting portions are manufactured. Therefore, if "plate-like supporting portions" are employed, predetermined elastic characteristics can be attained on a plane with high precision and also adjustment such as trimming can be neglected without fine pattern technology for which special dimensional control is required. As shown in FIGS. 3B to 3E and FIGS. 4A to 4C, the plan shapes of the supporting portions of the present invention may be formed such that respective supporting portions are formed to have symmetrical structures with respect to symmetrical axes in predetermined directions shown by a broken line in FIG. 3A. Otherwise two or more (4, 6, 8, . . . ) elastic structural bodies 26 forming respective supporting portions are arranged symmetrically with respect to the symmetrical axes, as shown in FIGS. 5A and 5B. In FIGS. 5A and 5B, respective elastic structural bodies 26 per se are not necessarily formed as symmetrical structures.

In the first aspect of the present invention, the drive electrodes for driving the vibration mass in the first axis direction and the detection electrodes (sense electrodes) for detecting displacement of the vibration mass in the second axis direction are installed separately. Instead, the drive electrodes and the detection electrodes may be formed commonly by the same opposing electrodes. Particularly, as shown in FIG. 1 (and the equivalent circuit representation is also shown in left side of FIG. 6A), the plural pairs of opposing electrodes which are formed of two stationary drive electrodes (R1, R1) and opposing vibration drive electrodes being electrically isolated are prepared, then the vibration mass is driven in the first axis (drive axis) direction by the electrostatic attractive forces which are caused by applying the drive voltages V1, V2 to two stationary drive electrodes (R1, R1) simultaneously. For example, by using two capacitors, or two pairs of opposing electrodes of one kind commonly as the drive electrodes for driving the vibration mass and the detection electrodes for detecting the Coriolis force, an information relating to the vibration amplitude of the vibration mass in the first axis (drive axis) direction is detected from a sum of C1 and C2, and also an information relating to displacement of the vibration mass in the second axis (detection axis) direction due to the Coriolis force is detected from a difference between C1 and C2, if we assume that electrostatic capacitances between two stationary drive electrodes (R1, R1) and opposing vibration drive electrodes are C1, C2, respectively.

As shown in FIG. 6A, if the drive electrodes are split into plural drive electrodes, or four capacitors such that a plurality (four) of voltage values (V1, V2, V1-, V2-) are applied independently to the drive electrodes, the angular velocity sensor can be formed to cause no problem even if the vibration mass and the supporting portions are formed asymmetrically with respect to the first axis direction during manufacturing processes.

According to a second aspect of the present invention, in addition to the first aspect, there is provided a stopper for limiting displacement of the vibration mass along the normal direction to the substrate (third axis direction), and the each stationary drive electrode and/or the each stationary detection electrode are(is) fixed to the substrate by more than two locations.

The stationary drive and/or stationary detection electrode (s) may be fixed to the substrate with overall surface thereof. As illustrated in FIG. 19A, if the comb electrodes (stationary drive electrodes) to be fixed to the substrate 7 are formed as the beam structure both ends of which are supported, their rigidity can be improved. Alternatively, as shown in FIG. 19C, if rigidity of the stopper having an overhung structure, such as the canopy-like structural body 116, is set to a desired value, displacement of the vibration mass can be suppressed not to cause miss steps between the comb electrodes against the large-scale input such as falling impact.

According to a third aspect of the present invention, there is provided a method for self-diagnosing functions of an electromechanical system of the angular velocity sensor by controlling the vibration amplitude within a predetermined value along a detection axis (second axis) direction of the Coriolis force of the vibration mass, or controlling the vibration amplitude along a drive axis to a different value from that in normal operation, or applying a quasi force to the vibration mass along an angular velocity input axis (third axis) direction. In other words, according to the third aspect of the present invention, in the angular velocity sensors according to the first and second aspects, self-diagnosis of the angular velocity sensor is carried out by driving the vibration mass in the direction along the second axis of the orthogonal coordinate system to vibrate, or modulating the vibration amplitude of the vibration mass in the direction along the first axis of the orthogonal coordinate system, or applying the quasi force to the vibration mass in the direction of the third axis of the orthogonal coordinate system.

According to the third aspect of the present invention, the movable dust entered between the vibration mass and the substrate does not cause destruction of the vibration system in operation. In addition, trouble with functions of the angular velocity sensor can be detected previously to therefore improve reliability of the angular velocity sensor.

Incidentally, it is a matter of course that the present invention is not limited to the angular velocity sensor having only one vibration mass but the present invention may be applied to the angular velocity sensor having a plurality of vibration masses. For example, if a pair of vibration masses are driven in opposite phases respectively and then detected outputs are differentially amplified, high sensitivity detection can be achieved by the angular velocity sensor.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 6A is a circuit diagram showing a configuration of a detection circuit of the angular velocity sensor according to the first embodiment of the present invention;

FIG. 6B is an equivalent circuit diagram showing a circuit configuration in the neighboring of the electrode portion in the detection circuit in FIG. 6A;

DETAILED DESCRIPTION OF THE EMBODIMENTS

Figure 1A:
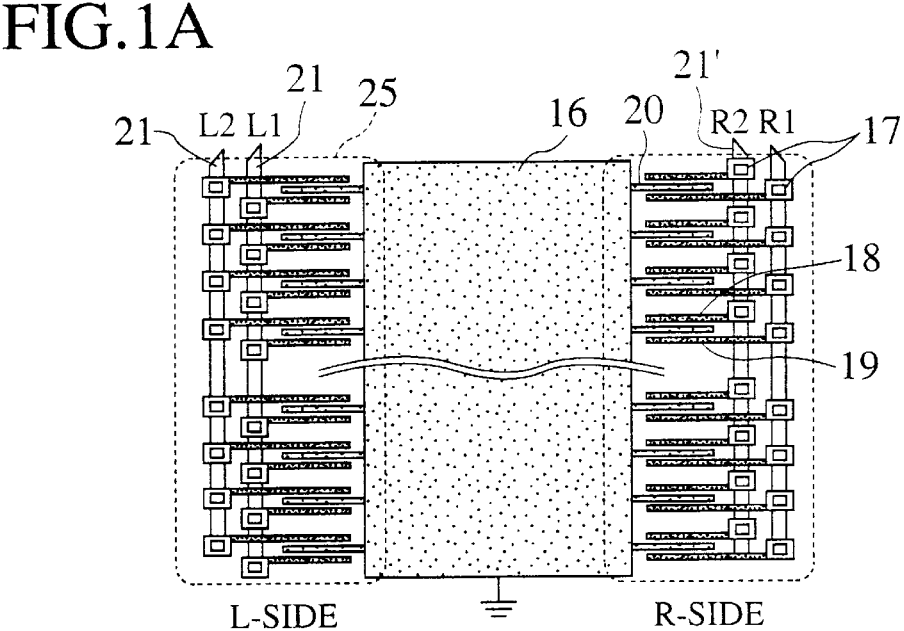
FIGS. 1A and 1B are schematic plan views showing respectively a vibration mass and electrode portions of an angular velocity sensor according to a first embodiment of the present invention.
Figure 1A:
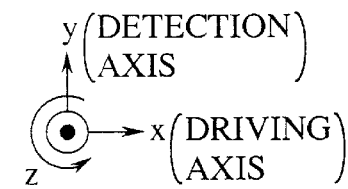

Various embodiments of the resent invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of semiconductor devices, it will be appreciated that the various drawings are not to scale from one figure to another nor inside a given figure, and in particular that the layer thicknesses are arbitrarily drawn for facilitating the reading of the drawings.

(First Embodiment)

Figure 1B:
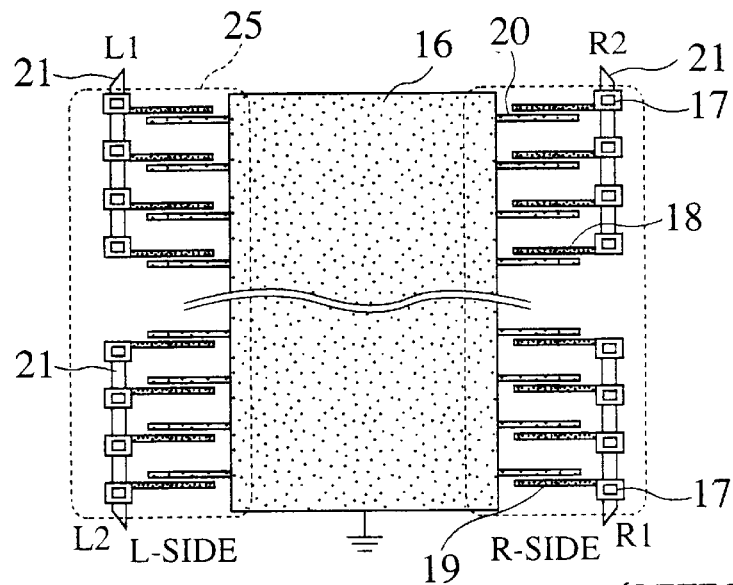
Figure 1B:
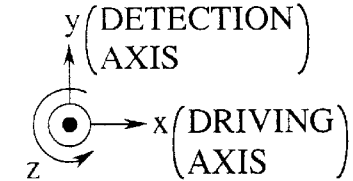

FIGS. 1A and 1B are schematic plan views showing respectively a vibration mass and electrode portions of an angular velocity sensor, which being formed of thin film structural materials, according to a first embodiment of the present invention. In FIGS. 1A and 1B, a vibration mass 16 is connected to a common potential via supporting portions. The supporting portions are omitted for illustration in FIGS. 1A and 1B since they will be described later. Comb electrodes (vibration drive/detection electrodes) 20 are formed to extend from sides surfaces of the vibration mass 16. Other comb electrodes (stationary drive/detection electrodes) 18 and 19 are opposed to both side surfaces of the comb type electrodes 20 at predetermined electrode gaps respectively. In FIG. 1A, the other comb electrodes (opposing electrodes) 18 and 19 are provided on both side surfaces of one comb electrode 20 so as to sandwich the comb electrode 20. In FIG. 1B, the other comb electrode (opposing electrode) 18 or 19 is opposed to either side surface of one comb electrode 20. The opposing electrodes 18 and 19 are connected to leading electrodes 21 in the connection portions 17 and then connected to a peripheral circuit (not shown) via the leading electrodes 21. The opposing electrodes (stationary electrodes) 18 and 19 are isolated electrically from the comb electrodes (vibration electrodes) 20 and constitute electrostatic capacitances between the vibration electrode 20 and the opposing stationary electrodes 18 and 19. The vibration mass 16, the vibration electrodes 20 and the opposing stationary electrodes 18 and 19 as shown can be formed by single crystal silicon, polysilicon, or metal stacked by electroplating according to the well known technology. Usually thicknesses of the vibration mass, vibration electrodes and the stationary electrodes are about several $\mu$m.

Figure 2A:
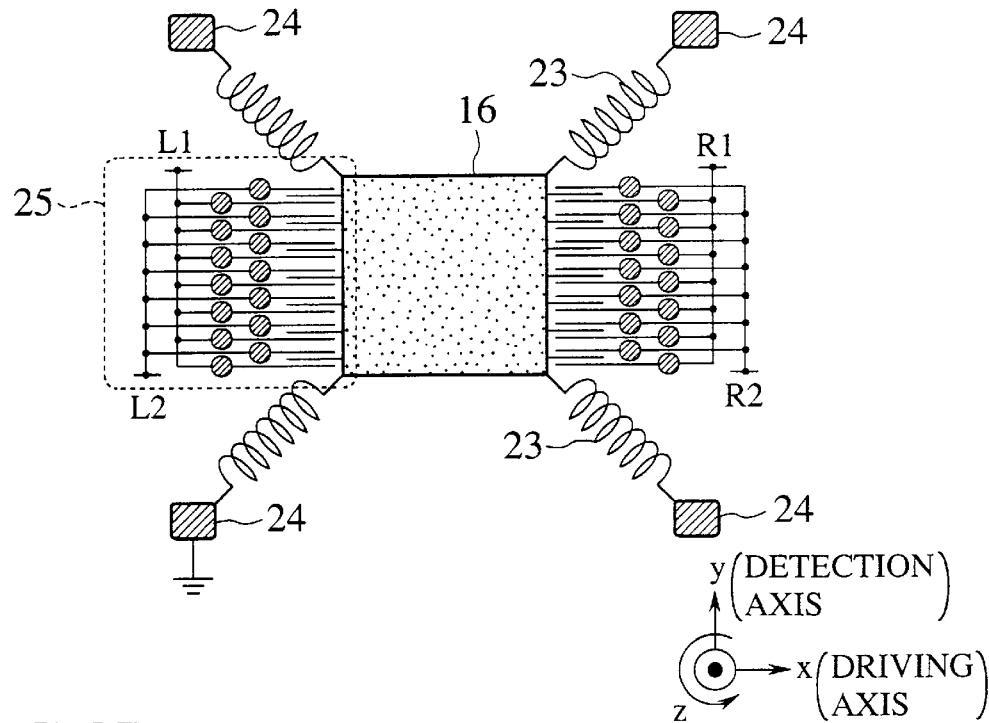
FIGS. 2A and 2B are schematic plan views showing respectively supporting portions of the vibration mass of the angular velocity sensor according to the first embodiment of the present invention.
Figure 2B:
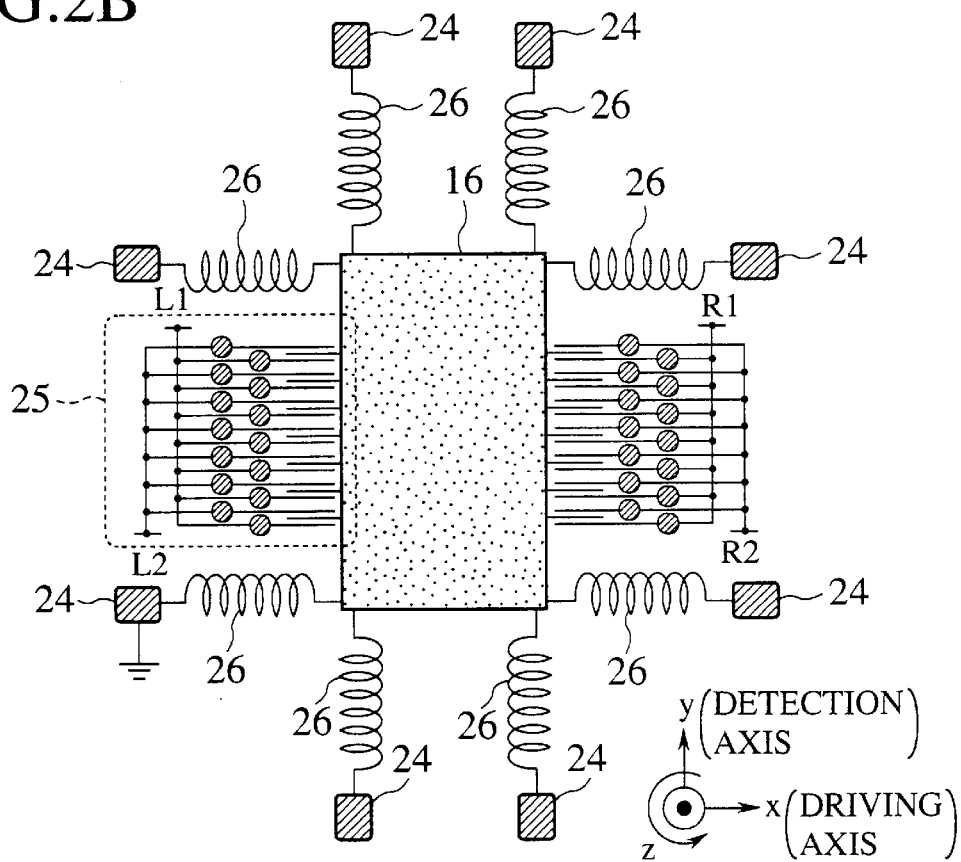

FIGS. 2A and 2B are schematic plan views showing respectively supporting states of the vibration mass 16 formed of thin film structural material in the angular velocity sensor according to the first embodiment of the present invention. Although structures of the electrode portions shown in FIG. 1A are illustrated in FIGS. 2A and 2B, such structures can be achieved similarly with the electrode structure shown in FIG. 1B.

Figure 3A:
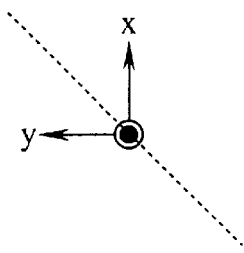
FIGS. 3A to 3E and FIGS. 4A to 4C are plan views showing respectively a detailed structure of the supporting portions shown in FIG. 2A.
Figure 3B:
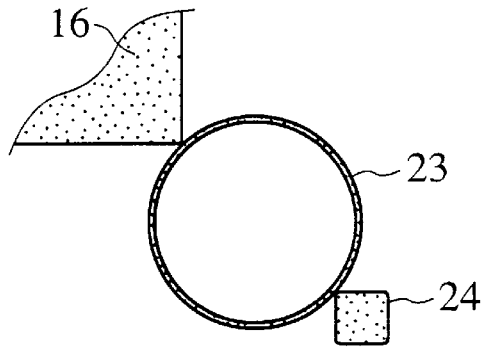
Figure 3C:
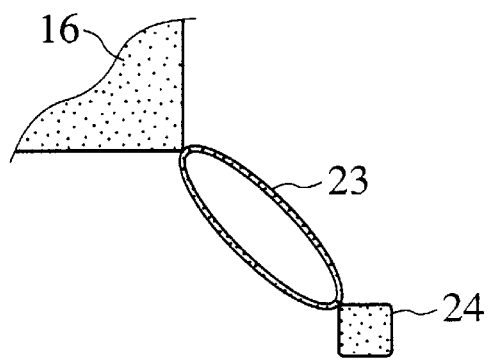
Figure 3D:
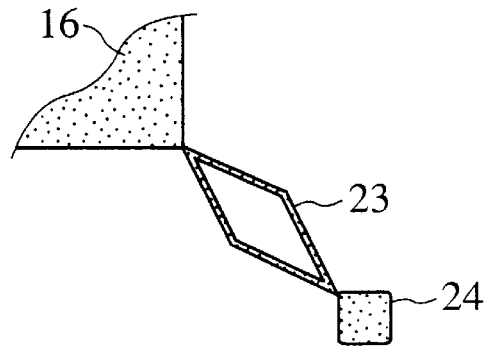
Figure 3E:
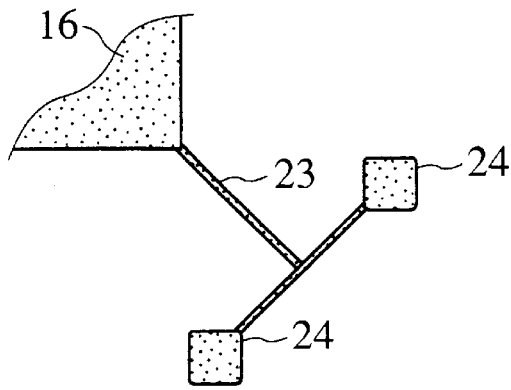
Figure 4A:
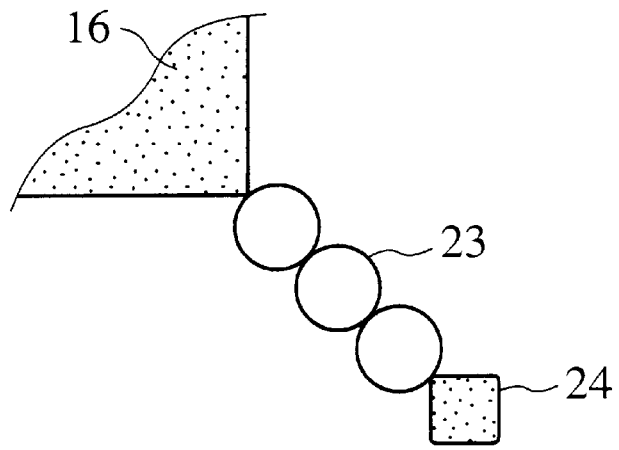
Figure 4B:
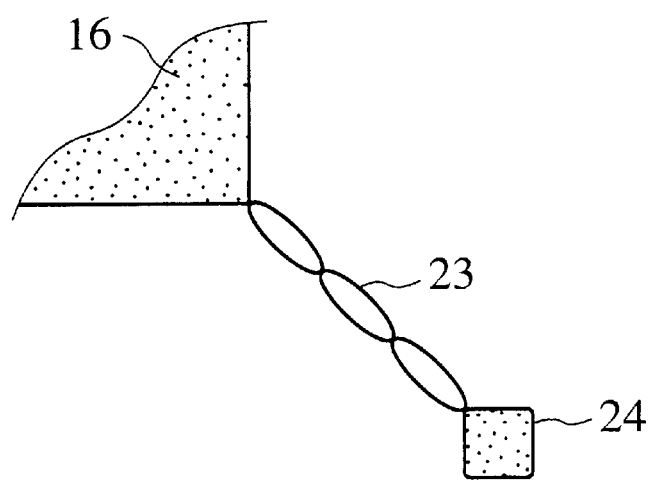
Figure 4C:
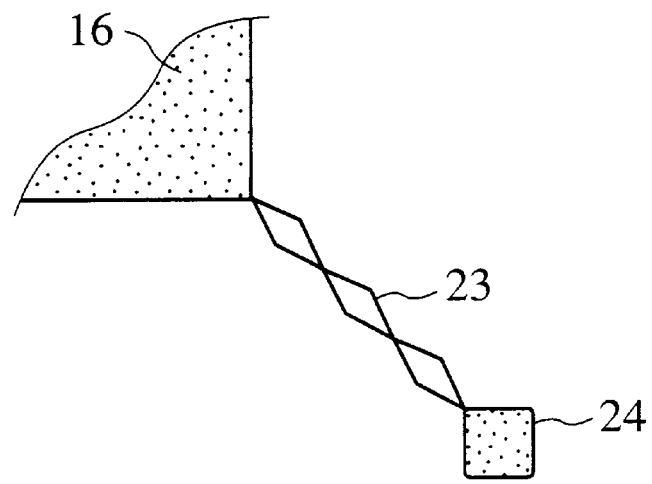

As shown in FIG. 2A, the four corner portions of the vibration mass 16 are also formed of thin film structural material, or the vibration mass 16 is connected to fixed portions via supporting portions 23, arranged in the bisecting direction between x and y axes, formed of the thin film structural material having equal spring constants. Though the supporting portions 23 are expressed by symbols in FIG. 2A, they have detailed structures shown in FIGS. 3B to 3E and FIGS. 4A to 4C. The vibration mass 16 can be displaced by the structure shown in FIG. 2A in a x-y plane and has an identical resonance frequency (eigenfrequency) for x and y axes. As shown in FIG. 3A, the supporting portions 23 are arranged symmetrically with respect to the bisecting direction between the x and y axes. A broken line shown in FIG. 3A is an axis of symmetry. Ends of the supporting portions 23 at the opposite side to the vibration mass 16 are fixed to a substrate (a base plate) at the fixing portions 24 and are electrically connected by virtue of conductive materials (not shown) and wirings.

Figure 5A:
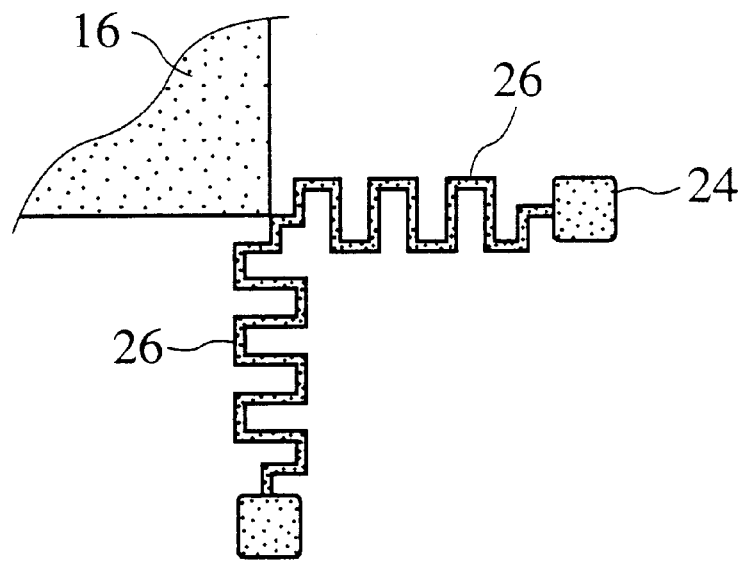
FIGS. 5A and 5B are plan views showing respectively a detailed structure of the supporting portions shown in FIG. 2B.
Figure 5B:
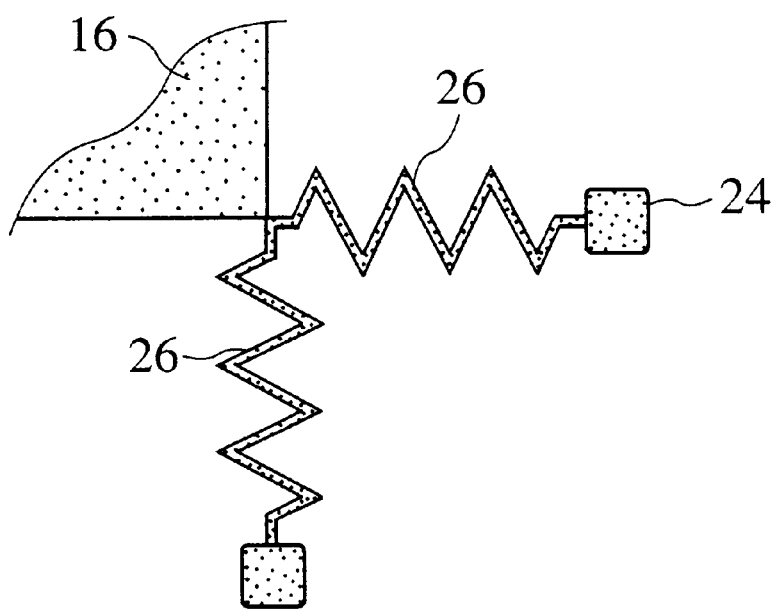

In the case of FIG. 2B, respective supporting portions are made up of a plurality of elastic structural bodies 26. Two elastic structural bodies 26 are provided at each corner in FIG. 2B to permit the supporting portion to be displaced in an x-y plane (a first axis-second axis plane), but the supporting portion may be constituted by four, six, etc. of elastic structural bodies 26. In other words, each supporting portion connected to the vibration mass of the present invention may be constituted by two or more elastic structural bodies. And at least two of the supporting portions must be constituted by the plural elastic structural bodies, respectively. The supporting portions constituted by two or more elastic structural bodies are shown in plan views of FIGS. 5A and 5B. In FIGS. 5A and 5B, the supporting portions 26 are arranged symmetrically with respect to an axial direction to bisect an angle between the x axis and the y axis, like FIG. 3A. By providing such elastic structural bodies, the supporting portions 26 have equal spring constants in both axis directions. And the vibration mass 16 supported by such elastic structural bodies 26 is made possible to displace in x and y axis directions and has the same resonance frequency (eigenfrequency). As the supporting portions 26 in FIG. 2B, it is a matter of course that the structures of the supporting portions shown in FIGS. 3B to 3E and FIGS. 4A to 4C may be used.

Although FIGS. 3B to 3E, FIGS. 4A to 4C, and FIGS. 5A and 5B only show plan shapes respectively, their cross-sectional shapes have a uniform thickness and constitute "plate-like supporting portions" defined by the present invention. If thicknesses of the supporting portions 23, 26 are substantially uniform, elastic characteristics in a plane parallel to the principal plane of the vibration mass are determined depending upon their plan shapes of the supporting portions 23 (26) after being fabricated. Therefore, if they are formed as symmetrical structures shown in FIGS. 3B to 3E, FIGS. 4A to 4C, and FIGS. 5A and 5B to have substantially their uniform thicknesses, desired characteristics can be easily achieved without using fine patterning technology. In addition, modification such as trimming after manufacturing process can be omitted to thus increase productivity. However, if such a technical background is taken into account that surface machining precision in semiconductor manufacturing technology is higher than general machining precision, the plate-like supporting portions of the present invention is well fitted for semiconductor working technology. Hence, the above descriptions should be interpreted in the meaning that deviation of thickness and variation in cross-sectional shape are allowed only in semiconductor fabrication technology.

Next, a configuration of a detection circuit of the angular velocity sensor according to the first embodiment will be explained with reference to FIG. 6A. In FIG. 6A, electrostatic capacitances between independent stationary electrode terminals R1, R2, L1, L2 and vibration electrodes fixed to the vibration mass 16 shown in FIGS. 2A and 2B are assumed to $C_{R1}$, $C_{R2}$, $C_{L1}$, $C_{L2}$ respectively. A portion surrounded by a dotted line in FIG. 6A denotes the vibration mass 16 and the vibration electrodes, nodes connected to the vibration electrodes of the electrostatic capacitances $C_{R1}$, $C_{R2}$, $C_{L1}$, $C_{L2}$ denote potentials (GND) of the vibration mass which are connected to a common potential via the supporting portions. Opposing vibration electrode terminals R1, R2, L1, L2 are held at an equal DC bias value $V_{bias}$. As shown in FIG. 6B actually, two resistors R, though omitted from FIG. 6A, are connected in parallel with the reference electric capacitor $C_{ref}$ and the capacitances $C_{R1}$, $C_{R2}$, $C_{L1}$, $C_{L2}$, respectively, to stabilize the DC bias value $V_{bias}$. Only the capacitance $C_{R1}$ of four capacitances is schematically shown in FIG. 6B. The reference electric capacitors $C_{ref}$ are connected to the opposing stationary electrode terminals R1, R2, L1, L2 respectively, and drive voltages V1, V2, V1−, V2− are applied to the capacitances $C_{R1}$, $C_{R2}$, $C_{L1}$, $C_{L2}$ via the reference electric capacitors $C_{ref}$. Accordingly, sums of the DC bias value $V_{bias}$ and the drive voltages V1, V2, V1−, V2− applied via the reference electric capacitors $C_{ref}$ are applied to the stationary electrode terminals R1, R2, L1, L2. Voltages of the stationary electrode terminals R1, R2, L1, L2 are input into buffers 30 and then are subject to impedance transformation and then signal processing.

As shown in FIG. 6A, voltages on the terminals R1, R2 and L1, L2 are added by adders 311 and 312 respectively, then a difference between outputs of the adders 311 and 312 is calculated by a subtracter 321. Then an output of the subtracter 321 is input into a demodulator (DEM) 331 via a high-pass filter (HPF) 391. Synchronization detection is executed in the demodulator 331 with the use of an oscillator (OSC2) 361, then an output of the demodulator 331 is input into a low-pass filter (LPF) 341. An output of the low-pass filter 341 is fed back to oscillators (OSC1) 351, 352 to cause self-oscillation of the vibration mass and at the same time is input into a demodulator 332 once again to detect synchronization with an oscillator 351. An output of the demodulator 332 is then input into a controlling circuit 37 via a low-pass filter 342 as amplitude information of the vibration mass. An output being proportional to an angular velocity and voltage signals being in synchronism with an input from an oscillator 352 are output from the controlling circuit 37. The voltage signals V1$d$, V2$d$ synchronized with the oscillator 352 are input directly into adders 31 and simultaneously input into the adders 31 via inverters 38, and then an output of an oscillator 363 is added to such voltage signals in the adders 31. Resultant voltage outputs V1, V2, V1–, V2– are applied to the reference electric capacitors $C_{ref}$ to drive the vibration mass.

On the contrary, voltages on the terminals L1, R1 and L2, R2 are added by adders 313 and 314 respectively, then a difference between outputs of the adders 313 and 314 is calculated by a subtracter 322. Then an output of the subtracter 322 is input into a demodulator (DEM) 333 via a high-pass filter (HPF) 392. Synchronization detection is executed in the demodulator 333 with the use of an oscillator (OSC2) 362, then an output of the demodulator 333 is input into a demodulator 334 again via a low-pass filter (LPF) 343. Synchronization with an oscillator (OSC1) 353 is detected in the demodulator 334 and then an output of the demodulator 334 is input into the controlling circuit 37 via a low-pass filter 344 as displacement information due to a Coriolis force affecting to the vibration mass. The controlling circuit 37 is connected to a controller 44. The controlling circuit 37 starts self-diagnosis according to a control output from the controller 44 and then outputs a response signal in response to the control output. As described later, a timing of self-diagnosis of an angular velocity sensor installed in a vehicle as a rate gyroscope is determined by the controller 44 based on an ignition (IGN) key SW and a door lock SW on the driver's seat side.

Figure 7:
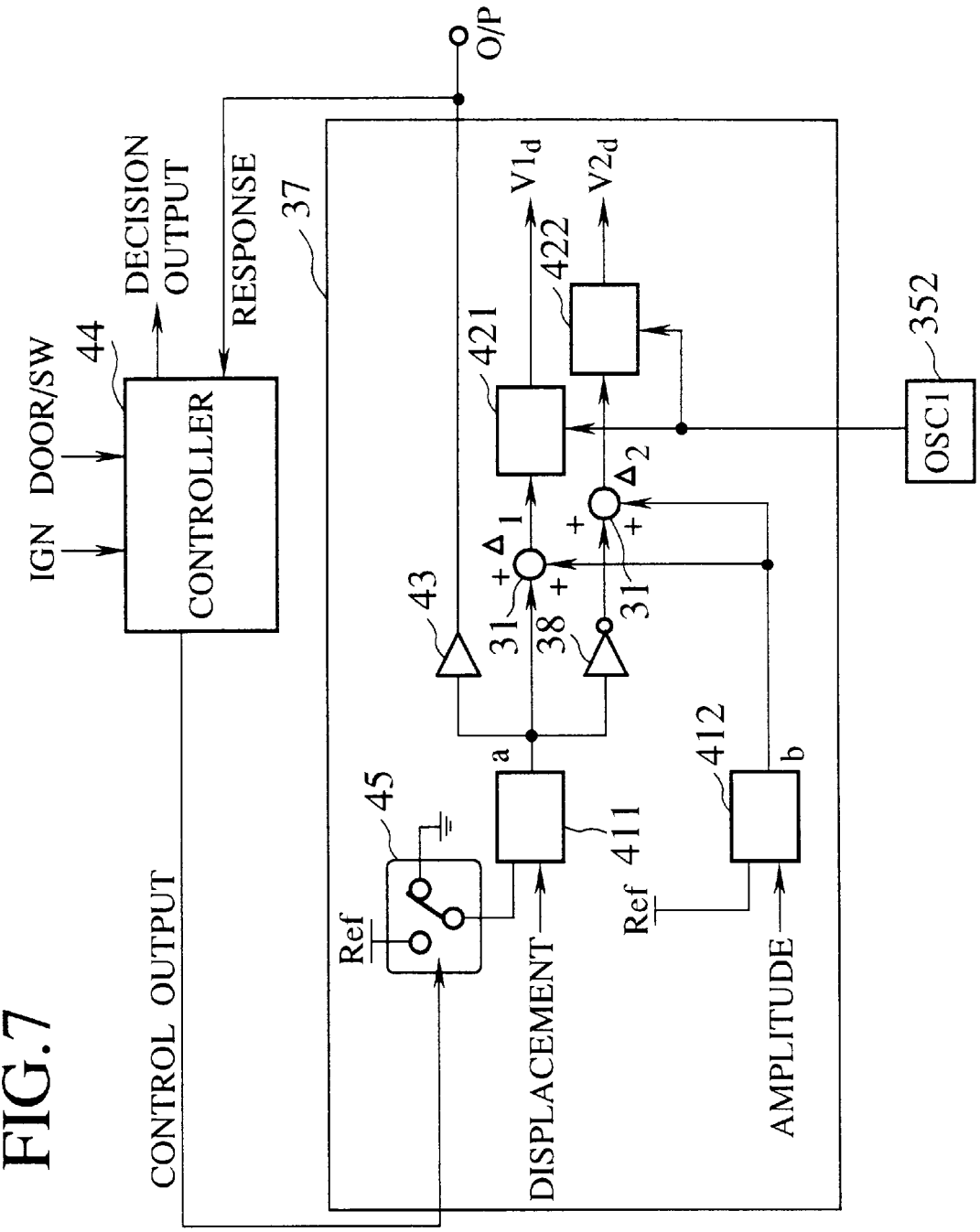
FIG. 7 is a circuit diagram showing a detailed configuration of the controlling circuit shown in FIG. 6A.

The controlling circuit 37 can be embodied as shown in FIG. 7, for example. Displacement information and amplitude information are input into arithmetic units 411, 412 respectively. In normal operation, the arithmetic unit 411 calculates a modulation amount of drive voltage in response to deviation from 0 level in displacement information, while the arithmetic unit 412 calculates a modulation amount of drive voltage in response to deviation from reference level in amplitude information. In self-diagnosis operation, the arithmetic unit 411 calculates a modulation amount of drive voltage in response to deviation from reference level in displacement information. The reference level can be converted between normal operation and self-diagnosis operation by a switch 45 which is switched by a control signal supplied from the controller 44. In FIG. 7, a modulation amount in displacement information is labelled as a and a modulation amount in amplitude information is labelled as b. The modulation amount a is output as an angular velocity which is input via an amplifier 43. Still further, the modulation amount a is output directly to an adder 31 and also output via an inverter 38 to the adder 31, and then the modulation amount b is added to the modulation amount a and the inverted modulation amount –a by the adders 31 to calculate modulation amounts $\Delta 1, \Delta 2$ of drive voltage. That is, $$\Delta 1 = a + b \quad (2)$$

$$\Delta 2 = -a + b \quad (3)$$

Calculated modulation amounts $\Delta 1, \Delta 2$ are input into amplitude modulators 421, 422 which modulate an amplitude of an output from an oscillator 352 according to the modulation amounts $\Delta 1, \Delta 2$ respectively to output drive voltages V1$d$, V2$d$. In other words, assuming that an amplitude of the output of the oscillator 354 is V$d$, the drive voltages V1$d$, V2$d$ are given by $$V1d = Vd \cdot (1 + \Delta 1) \quad (4)$$

$$V2d = Vd \cdot (1 + \Delta 2) \quad (5)$$

As shown in FIG. 6A, the drive voltage V1$d$ output from the controlling circuit 37 is added to an output of an oscillator 363 by the adder 31, and then is applied as V1 to the stationary electrode R1 opposing to the vibration electrode fixed to the vibration mass via the reference capacitor $C_{ref}$ (FIGS. 1A and 1B). As shown in FIG. 6A, the drive voltage V1$d$ output from the controlling circuit 37 is inverted by the inverter 38, then is added to the output of the oscillator 363 by the adder 31, and then is applied as V2– to the stationary electrode L2 opposing to the vibration electrode fixed to the vibration mass via the reference capacitor $C_{ref}$. In the meanwhile, the drive voltage V2$d$ is added to the output of the oscillator 363 by the adder 31, and then is applied as V2 to the stationary electrode L1 opposing to the vibration electrode via the reference capacitor $C_{ref}$. Also the drive voltage V2$d$ is inverted by the inverter 38, then is added to the output of the oscillator 363 by the adder 31, and then is applied as V1– to the stationary electrode R2 opposing to the vibration electrode via the reference capacitor $C_{ref}$.

Figure 8:
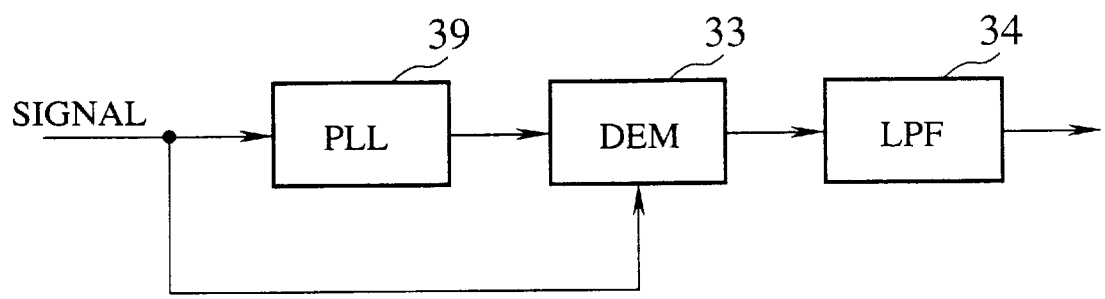
FIG. 8 is a block circuit diagram showing another configuration of the detection circuit of the angular velocity sensor according to the first embodiment of the present invention wherein detection is executed in accordance with a homodyne system using a PLL device.

Synchronization detection by the oscillators (OSC2) 361, 362 in the demodulators 331, 332 shown in FIG. 6A may be executed based on a homodyne system wherein, as shown in FIG. 8, signal frequency is detected by using a PLL device 39 and then synchronization detection is executed by using such signal frequency. Although the signals to which synchronization detection is executed by the oscillators (OSC1) 351, 353 in the demodulators (DEM) 332, 334 in FIG. 6A have been input into the controlling circuit 37 as amplitude information and displacement information, the demodulators 332, 334 may be replaced with other circuits such as integration circuits.

At first, a drive operation of the vibration mass will be explained. When voltage V is applied to the opposing electrodes R1, R2, L1, L2 via the reference electric capacitors $C_{ref}$, an electrostatic attractive force $F_d$ expressed by Eq. (6) is generated per unit opposing length of the comb electrodes (i.e., stationary and vibration electrodes) along the drive axis of the vibration mass.

$$F_d = (-n/2) \cdot \in_o \cdot (t/d_o) \cdot V^2 \quad (6)$$

Where
 n: number of stationary comb electrodes opposing to the vibration comb electrodes,
 $\in_o$: dielectric constant,
 t: thickness of the stationary/vibration comb electrodes, and
 $d_o$: distance between the stationary and vibration electrodes.

Here a negative sign in the first parenthesis indicates that a drive force $F_d$ is generated to increase overlap between the stationary and vibration electrodes.

An impedance of electric capacitor is expressed by $$Z_c = 1/c(j \cdot \omega \cdot c) \quad (7)$$

Where $\omega$ is the frequency of the drive voltages. Therefore, as shown in FIG. 6A, if the AC drive voltages are applied to the vibration mass 16 via the reference capacitors $C_{ref}$, then AC drive voltage V' applied to electric capacitances $C_{R1}$, $C_{L1}$, $C_{R2}$, $C_{L2}$ between the vibration electrodes and the opposing stationary electrodes will be expressed by $$V' = \frac{1}{C_s/C_{ref}+1} \cdot V'_{drive} \quad (8)$$

Where

V' drive: drive voltages V1, V2, V1−, V2− applied via the electric capacitors $C_{ref}$, and $C_s$: electric capacitances $C_{R1}$, $C_{L1}$, $C_{R2}$, $C_{L2}$ between the vibration electrodes and the opposing stationary electrodes.

Therefore, if the electric capacitors $C_{ref}$ are set sufficiently large rather than the electric capacitances $C_{R1}$, $C_{L1}$, $C_{R2}$, $C_{L2}$ between the vibration electrodes and the opposing stationary electrodes, loss of the drive voltage in the electric capacitors $C_{ref}$ can be practically ignored. If the electric capacitances $C_{R1}$, $C_{L1}$, $C_{R2}$, $C_{L2}$ are varied because of vibration drive, AC drive voltages to be applied are proportional to the AC drive voltages V1, V2, V1−, V2− applied via the electric capacitors $C_{ref}$. Since values of the capacitances $C_{R1}$, $C_{L1}$, $C_{R2}$, $C_{L2}$ are about~pF in practical use, the electric capacitors $C_{ref}$ can be formed easily on the same substrate by the method well known in the art, such as MOS technology.

Figure 9:
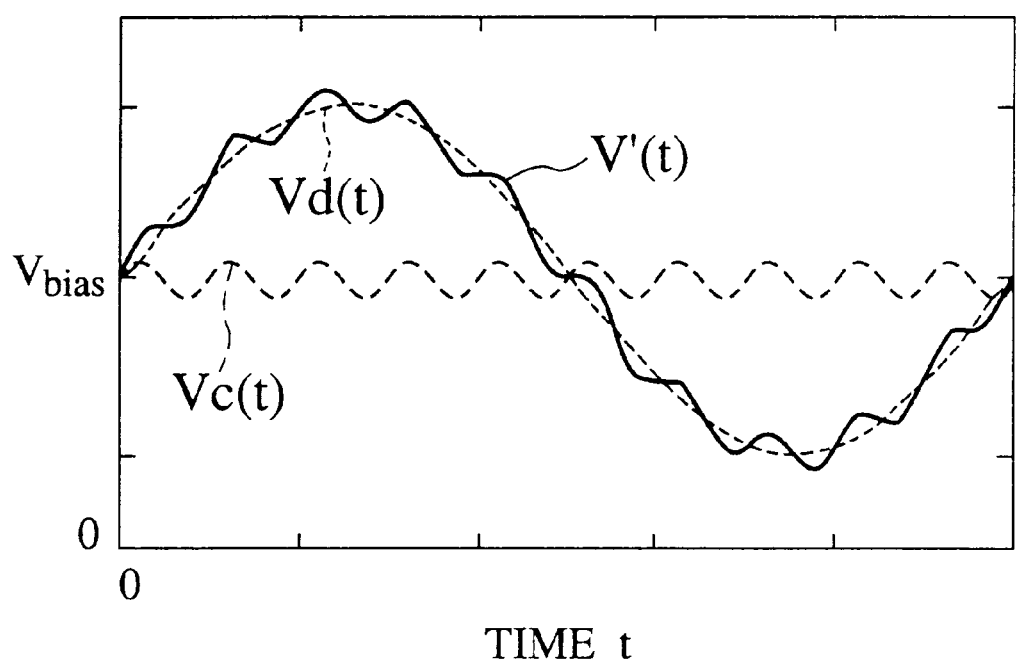
FIG. 9 is a chart illustrating a method of generating AC drive voltage in the angular velocity sensor according to the first embodiment of the present invention.

As shown in FIG. 6A, the AC drive voltage V' applied to V1, V2, V1−, V2− can be obtained by the adders 31 as a sum of a signal $v_d(t)$ from the oscillator (OSC1) 352 and an output $v_c(t)$ of the oscillator (OSC2) 363. The signal $v_d(t)$ can be obtained by modulating an output of the oscillator (OSC1) 352 having a frequency $\omega_1$ which coincides with a resonance frequency of the vibration mass. The output $v_c(t)$ can be obtained by the oscillator (OSC2) 363 which has a frequency $\omega_2$ higher than the frequency $\omega_1$ of the oscillator (OSC1) 352 and has a smaller output amplitude. The AC drive voltage V' is schematically shown in FIG. 9.

Voltages $V_{R1}$, $VR_2$, $V_{L1}$, $V_{L2}$ applied to the stationary electrodes R1, R2, L1, L2 opposing to the vibration eletrodes are given as sums of the DC bias voltage $V_{bias}$ and the foregoing AC drive voltage V', and expressed respectively as $$V_{R1}=V_{bias}+K\cdot[V_d(1+a+b)\cdot\sin \omega_1 t+V_c\cdot\sin \omega_2 t] \quad (9)$$

$$V_{R2}=V_{bias}+K\cdot[V_d(1-a+b)\cdot\sin \omega_1 t+V_c\cdot\sin \omega_2 t] \quad (10)$$

$$V_{L1}=V_{bias}+K\cdot[-V_d(1-a+b)\cdot\sin \omega_1 t+V_c\cdot\sin \omega_2 t] \quad (11)$$

$$V_{L2}=V_{bias}+K\cdot[-V_d(1+a+b)\cdot\sin \omega_1 t+V_c\cdot\sin \omega_2 t] \quad (12)$$

Where $V_d$: amplitude of the signal $V_d(t)$ in proportional to the output of the oscillator 352, $V_c$: amplitude of the output signal $V_c(t)$ of the oscillator 363, and K: coefficient indicating drive voltage drop due to the reference capacitor $C_{ref}$.

An electrostatic attractive force $F_d$ can be obtained by substituting Eqs. (9) to (12) into Eq. (6). The electrostatic attractive force $F_d$ affected on R1 and R2 is directed in the opposite direction to those of on L1 and L2. Namely, an electrostatic drive force $F_d$ expressed by Eq. (13) is generated on the vibration mass.

$$F_d \propto V_{bias}\cdot V_d\cdot(1+b)\cdot\sin \omega_1 t \quad (13)$$

In Eq. (13), a drive force due to the term of sin $\omega_2 t$ having a frequency higher than the frequency $\omega_1$ is ignored since such drive force has no influence on a vibration system which has a resonance frequency around the frequency $\omega_1$. It can be understood from Eq. (13) that the drive force can be adjusted according to the modulation amount b concerning amplitude information.

Assuming that overlap of the stationary and vibration comb electrodes in a stationary state is L and a distance between teeth of the stationary and vibration comb electrodes is d, change in the electrostatic capacitance $C_s$ due to drive length x of the vibration mass and displacement y caused by the Coriolis force can be expressed as $$C_s = C_{so}\frac{1+(x/L)}{1+(y/d)} \quad (14)$$

Where $C_{so}$: electrostatic capacitance $C_s$ in a stationary state.

Because of change in the electrostatic capacitance $C_s$ between the stationary electrode terminals R1, R2, L1, L2 and the vibration electrode terminals, AC voltages $V'_{R1}$, $V'_{R2}$, $V'_{L1}$, $V'_{L2}$ on the opposing stationary electrode terminals R1, R2, L1, L2 can be derived as shown in following Eqs. (15) to (18) using above Eqs. (8), (9) to (11), and (14). However, only linear terms of (x/L) and (y/d) are developed in this case.

$$V'_{R1}=(1/B)\cdot[1-A(x/L)+A\cdot(y/d)]\cdot[V_d(1+a+b) \sin \omega_1 t+V_c \sin \omega_2 t] \quad (15)$$

$$V'_{R2}=(1/B)\cdot[1-A(x/L)-A\cdot(y/d)]\cdot[V_d(1-a+b) \sin \omega_1 t+V_c \sin \omega_2 t] \quad (16)$$

$$V'_{L1}=(1/B)\cdot[1-A(x/L)+A\cdot(y/d)]\cdot[-V_d(1-a+b) \sin \omega_1 t+V_c \sin \omega_2 t] \quad (17)$$

$$V'_{L2}=(1/B)\cdot[1-A(x/L)-A\cdot(y/d)]\cdot[-V_d(1+a+b) \sin \omega_1 t+V_c \sin \omega_2 t] \quad (18)$$

Where, $$A = \frac{C_{so}/C_{ref}}{C_{so}/C_{ref}+1} \quad (19)$$

$$B = \frac{C_{so}}{C_{ref}}+1 \quad (20)$$

By making use of the detection circuit shown in FIG. 6A, displacement of the vibration mass due to drive in the X axis direction can be detected in the following. In other words, the AC voltages $V'_{R1}$, $V'_{R2}$, $V'_{L1}$, $V'_{L2}$ on the stationary electrode terminals R1, R2, L1, L2 are passed through the buffers 30 having low output impedance and then added by the adders 313, 314, and then the difference between the outputs of the adders 313, 314 is calculated by the subtracter 321. The result is expressed by Eq. (21).

$$(V'_{R1}+V'_{R2})-(V'_{L1}+V'_{L2})=(4/B)\cdot[V_d\cdot(1+b) \sin \omega_1 t-A\cdot(x/L)\cdot V_c\cdot\sin \omega_2 t] \quad (21)$$

Figure 10A:
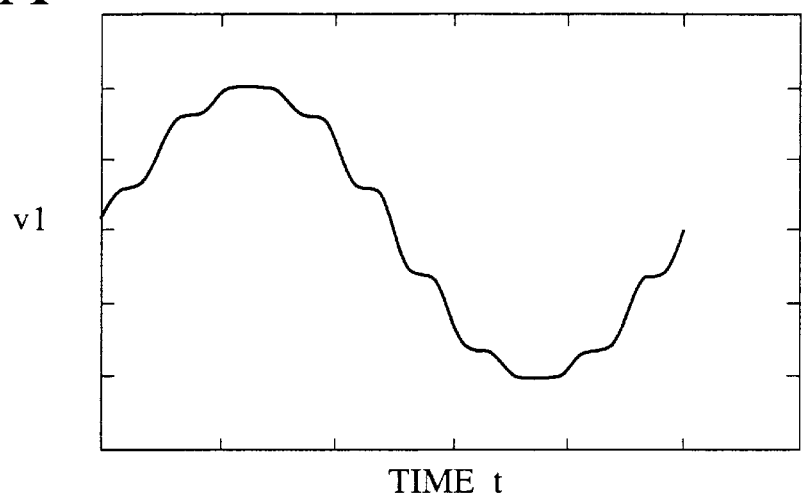
FIGS. 10A to 10C are charts illustrating respectively variations in signals v1, v2, v3 in the detection circuit relative to elapsed time when displacement in the x-axis direction is detected with the use of the detection circuit shown in FIG. 6A.
Figure 10B:
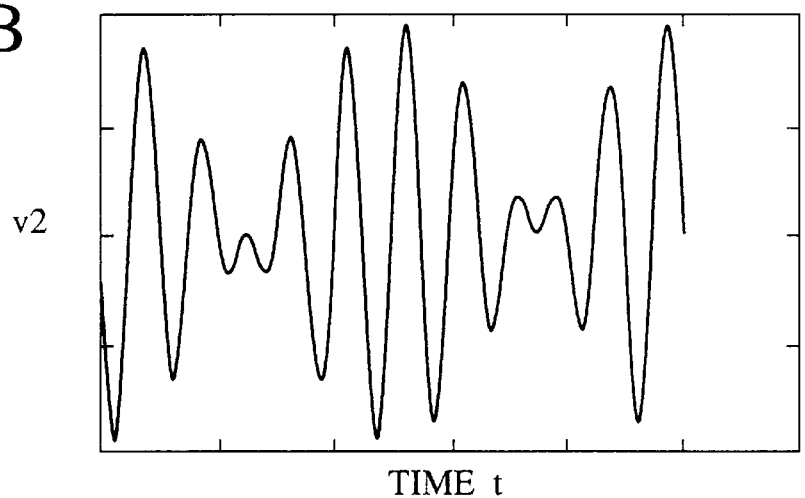
Figure 10C:
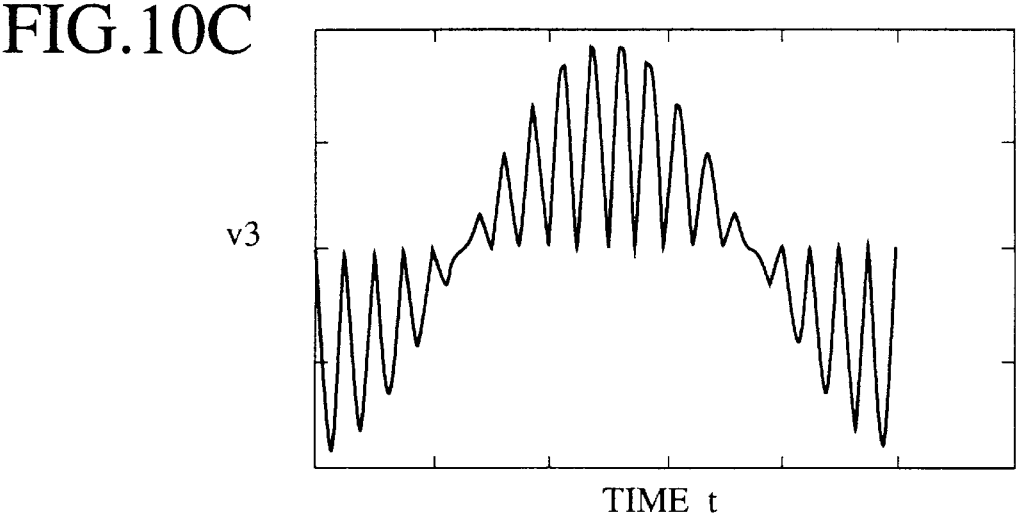

The output of the subtracter 321 is shown as v1 in FIG. 6A. The change in the output v1 with elapsed time is schematically shown in FIG. 10A. The first term of Eq. (21) can be eliminated by the high-pass filter 391. The signal v2 derived after elimination of the first term is shown in FIG. 10B as a schematic view. As shown in FIG. 6A, the signal v2 is input into the demodulator 331, and then synchronization with the output from the oscillator 361 is detected in the demodulator 331. After the synchronization detection, the signal v3 is shown in FIG. 10C. As shown in FIG. 6A, the signal v3 is further filtered by the low-pass filter 341. The filtered signal has a period which is identical to that of the oscillator 351 and has an amplitude which is in proportion to the drive amplitude of the vibration mass. This signal is fed back to the oscillator 351 to cause self-oscillation. At the same time, after synchronization with the output of the oscillator 351 is taken in the demodulator 332 once again to achieve an AGC function, the output of the demodulator 332 is filtered by the low-pass filter 342 and then input into the controlling circuit 37 to control amplitudes of the drive voltages V1, V2, L1−, L2−.

Figure 11A:
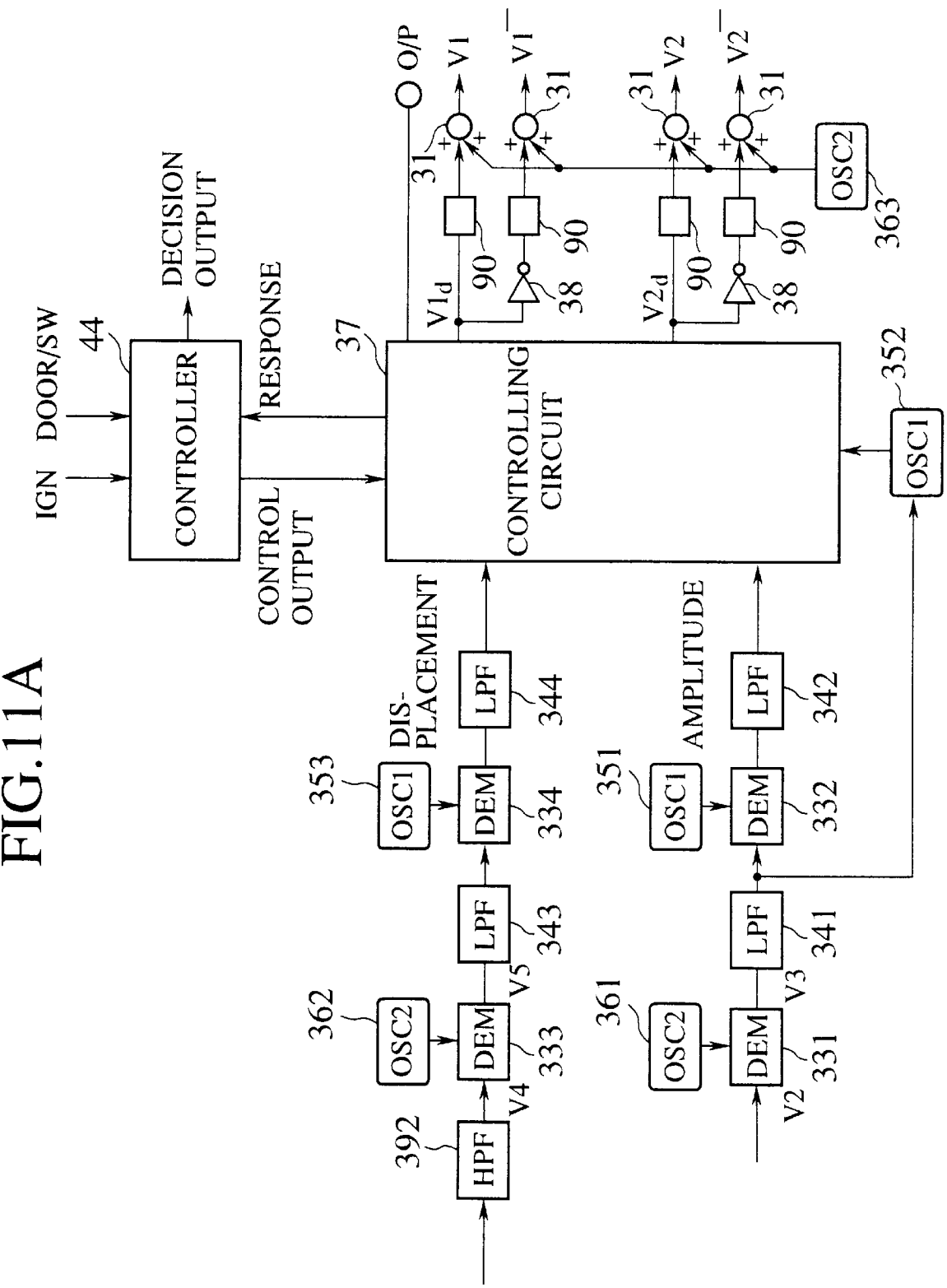
FIG. 11A is a circuit diagram showing a part of a detection circuit of a angular velocity sensor according to modification of the first embodiment of the present invention, whereby another approach to detect a displacement in an x-axis direction is achieved.
Figure 11B:
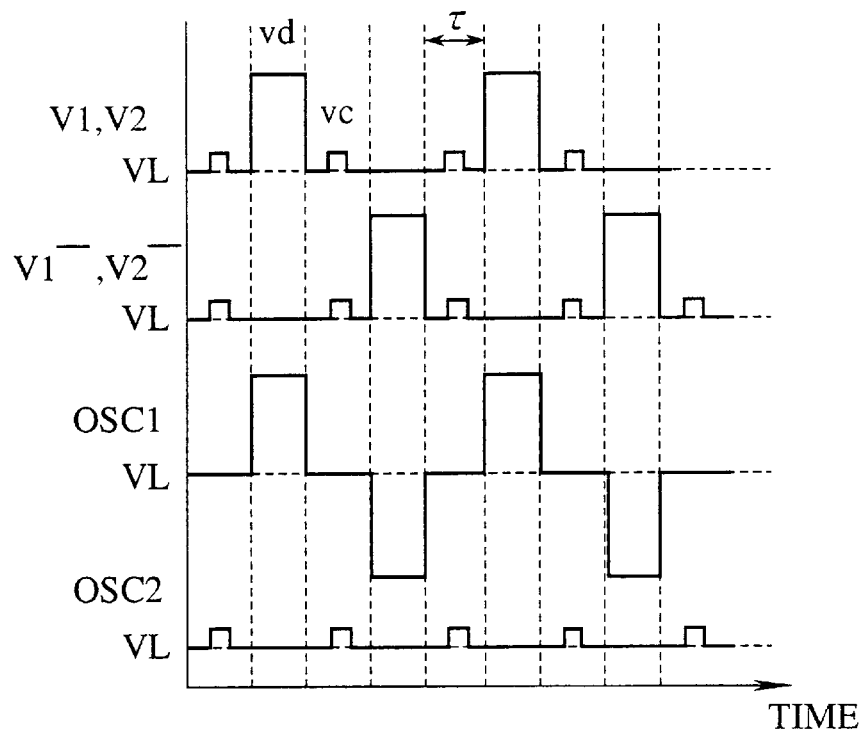
FIGS. 11B and 11C are timing charts illustrating respectively timings of a drive voltage applied between respective opposing electrode terminals via a reference capacitor $C_{ref}$ relative to elapsed time according to the circuit configuration shown in FIG. 11A.
Figure 11C:
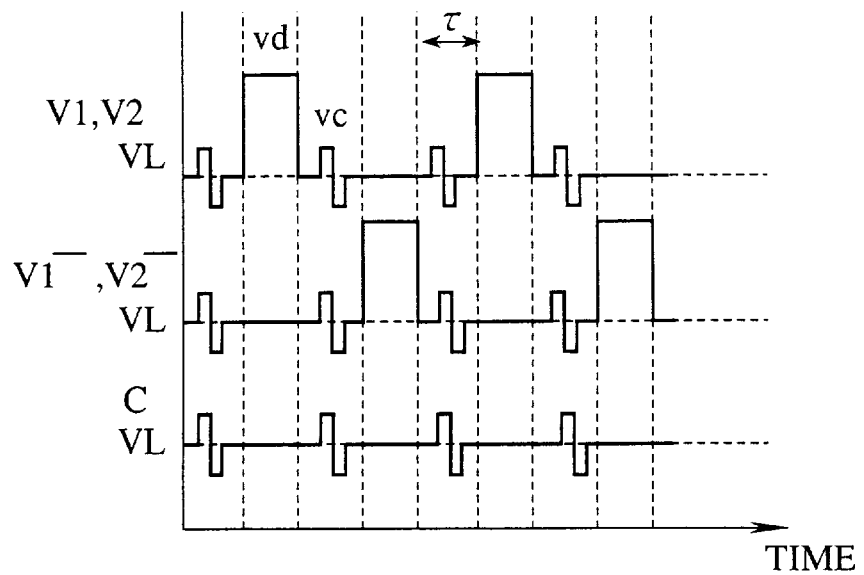

FIGS. 11A to 11C show another approach to detect a displacement in the X axis direction by driving the vibration mass. FIGS. 11B and 11C show drive voltages V1, V2, L1−, L2− applied via reference capacitors $C_{ref}$ 29 like FIG. 6A. The drive voltages consist of a large amplitude voltage $V_d$ for generating the drive force, and a small amplitude voltage $v_c$ for reading displacement due to the Coriolis force. The small amplitude voltage, or the read voltage $V_c$ has an amplitude which is sufficiently small rather than the amplitude of the vibration mass and that of the large amplitude voltage $V_d$. As shown in FIG. 11A, the large amplitude voltage $V_d$ is a voltage obtained after the output signal of the oscillator (OSC1) 352 is passed via the inverter 38 and an ideal diode circuit 90. The read voltage $V_c$ is the output voltage of the oscillator (OSC2) 363. The read voltage $v_c$ may be formed of a unipolar pulse as shown in FIG. 11B or a bipolar pulse as shown in FIG. 11C. The voltages $V_d$ and $v_c$ are applied alternatively. In FIG. 11B and 11C, although a time period during when no voltage is applied is provided in the middle of application of the voltages $V_d$ and $v_c$, fundamental functions of the controlling circuit 37 are similar unless this time period is provided. The voltage $V_d$ for V1− and V2− is applied in the opposite phase to those of V1 and V2. The read voltage $v_c$ for V1 and V2 is applied simultaneously with those for V1− and V2− in a time period τ during when the voltage $V_d$ is not applied. Because of the electrostatic force $F_d$ generated by application of the voltage $V_d$ according to above Eq. (6), the same frequency as that of the oscillator (OSC1) 352 can be applied to the vibration mass. Since the read voltage $V_c$ is applied to V1, V2 and V1−, V2− simultaneously, electrostatic forces generated by the read voltage $V_c$ are canceled unless the vibration mass is displaced due to the Coriolis force. Further, since the read voltage $V_c$ has an amplitude which is sufficiently small rather than that of the voltage $V_d$, the electrostatic attractive force generated can be ignored even if the vibration mass is displaced. As shown in FIG. 6A, sums and differences between the voltages on the stationary electrode terminals R1, R2, L1, L2 can be calculated via the buffers 30. Furthermore, the signal v2 is derived by passing the signal v1 through the high-pass filter 391. Similarly, drive amplitude of the vibration mass can be obtained by detecting the synchronization of the signal v2 with the output of the oscillator (OSC2) 361.

Figure 12A:
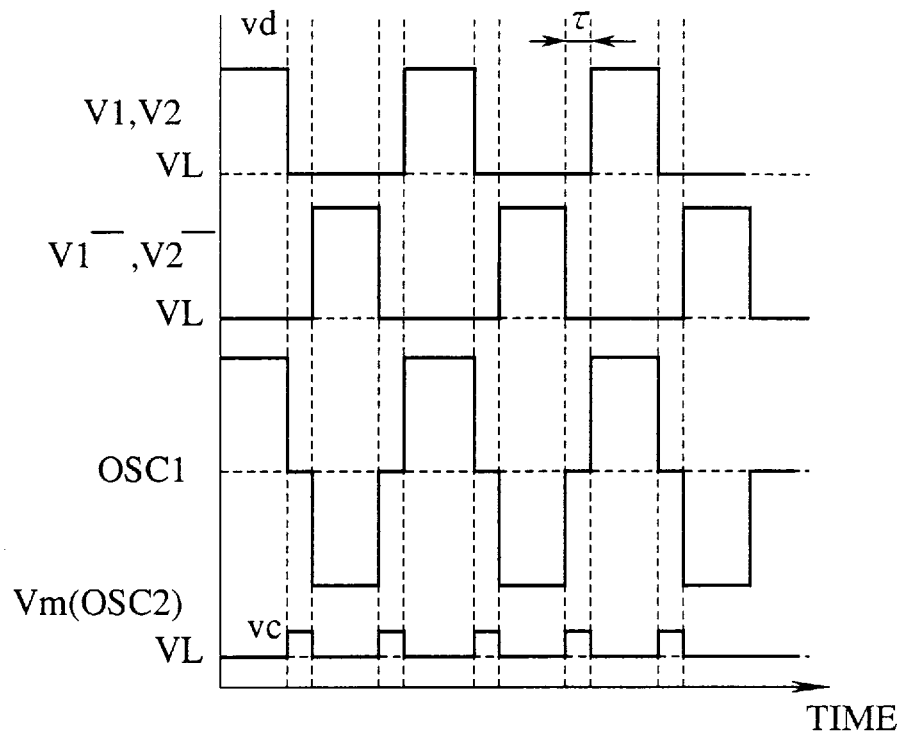
FIGS. 12A and 12B are timing charts illustrating respectively another timings of a drive voltage applied between respective opposing electrode terminals via the reference capacitor $C_{ref}$ relative to elapsed time according to the circuit configuration shown in FIG. 11A.
Figure 12B:
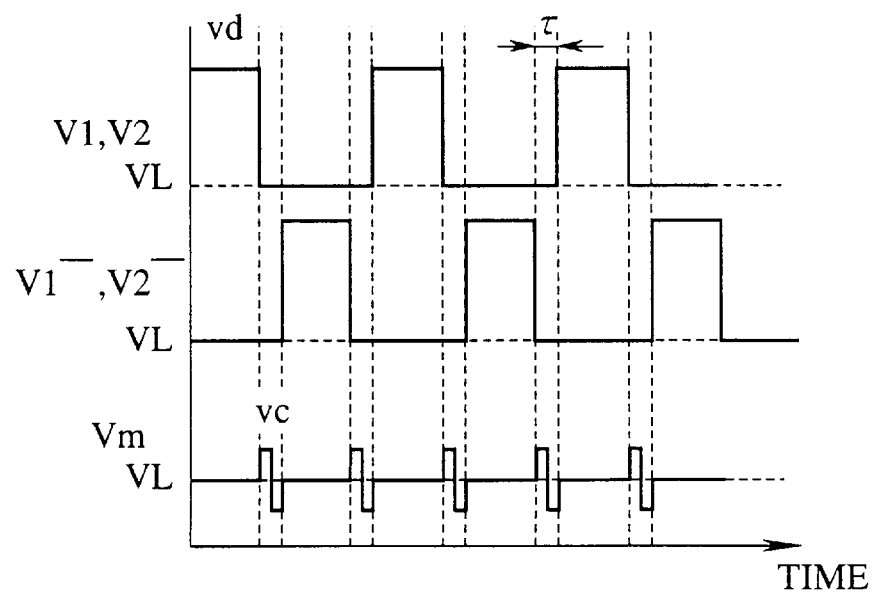

Other examples of the drive voltages V1, V2, V1−, V2− applied to via the reference electric capacitors $C_{ref}$ 29 are shown in FIGS. 12A and 12B. The drive voltage consists of the large amplitude voltage $V_d$ to generate a drive force. The voltage $V_d$ is an output voltage of the oscillator (OSC1) 352 (supplied directly and via the inverter 38). The voltage $V_d$ for V1− and V2− is applied in the opposite phase to those of V1 and V2. The drive voltages V1, V2, V1−, and V2− have a time period r during when no voltage $V_d$ is applied. The small amplitude voltage, or the read voltage $V_c$ is an output voltage of the oscillator (OSC2) 363 which outputs an output voltage having a sufficiently small amplitude in contrast to the large amplitude voltage $v_d$, and is applied to the vibration mass in the time period τ. The read voltage $v_c$ may be formed of a unipolar pulse as shown in FIG. 12A or a bipolar pulse as shown in FIG. 12B. Due to the electrostatic force $F_d$ generated by application of the voltage $V_d$ according to above Eq. (6), the same frequency as that of the oscillator (OSC1) 352 can be applied to the vibration mass. The read voltage $V_c$ is applied to the vibration mass in the time period τ. Unless the vibration mass is displaced due to the Coriolis force, electrostatic forces generated by the read voltage $V_c$ are canceled. Further, since the read voltage $V_c$ has an amplitude which is sufficiently small rather than that of the voltage $V_d$, the electrostatic attractive force generated can be ignored even if the vibration mass is displaced.

Displacement y of the vibration mass due to the Coriolis force will be detected in the following. In the first embodiment of the present invention, since the Coriolis force generated is in proportion to a vibration velocity $V_m(t)$ of the vibration mass, as shown in Eq. (1), the displacement y has the same period as the oscillator 352 and an amplitude of the signal is proportional to displacement due to the Coriolis force.

The output impedance of the stationary electrode terminals R1, L1, R2, L2 are made low by connecting the buffers 30, and the voltages $V'_{R1}$, $V'_{L1}$ and $V'_{R2}$, $V'_{L2}$ are added by the adders 313, 314 respectively, and then a difference therebetween is calculated by the subtracter 322. The result can be expressed as $$(V'_{R1}+V'_{L1})-(V'_{R2}+V'_{L2})=(4/B)\cdot[V_d\cdot a\cdot\sin \omega_1 t+A\cdot(y/d)\cdot V_c\cdot\sin \omega_2 t] \quad (22)$$

Figure 13A:
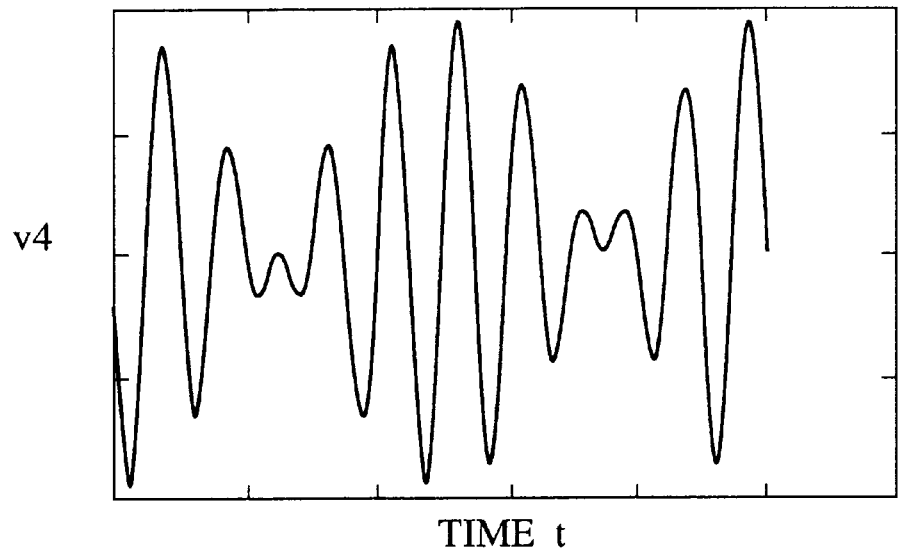
FIGS. 13A to 13B are charts illustrating respectively variations in signals v4, v5 in the detection circuit relative to elapsed time when displacement y caused by a Coriolis force is detected with the use of the detection circuit shown in FIG. 16A.
Figure 13B:
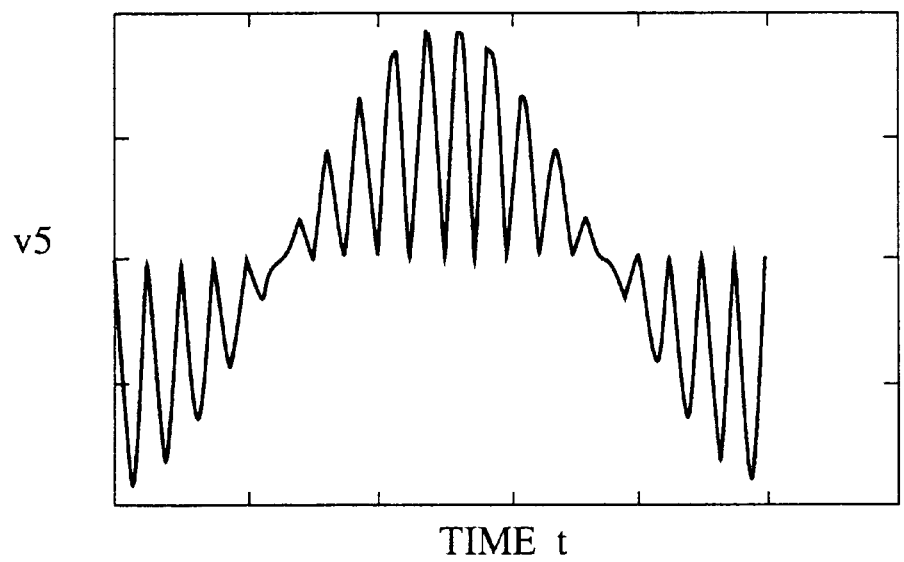

The first term is eliminated via the high-pass filter 392. After elimination of the first term, the signal v4 is shown schematically in FIG. 13A. As shown in FIG. 6A, synchronization of the signal v4 with the output of the oscillator (OSC2) 362 is detected in the demodulator 333. The signal v5 after synchronization detection is shown in FIG. 13B. As shown in FIG. 6A, the signal v5 is further filtered by the low-pass filter 343. The filtered signal has a period which is identical to that of the oscillator (OSC1) 352, 353 and has an amplitude which is in proportion to the displacement due to the Coriolis force. This signal is input into the demodulator 334 again so as to detect synchronization with the output of the oscillator (OSC1) 353, and then filtered by the low-pass filter 344. The filtered signal becomes a signal which being in proportion to the displacement of the vibration mass due to the Coriolis force, and then is input into the controlling circuit 37 to modulate amplitudes of the drive voltages V1, V2, L1−, L2−. In synchronization detection by the oscillator (OSC2) 362 in the demodulator 333, as shown in FIG. 8, the homodyne system may be used wherein signal frequency is detected by using the PLL device 39 and then synchronization detection is executed by using such signal frequency, so that demodulation with higher precision is made possible.

Next, methods of controlling the drive amplitude of the vibration mass to be constant and compensating the Coriolis force $F_c$ in accordance with modulation of the drive voltages V1, V2, V1−, V2− will be explained. By applying the modulated drive voltages V1, V2, V1−, V2−, electrostatic attractive forces are generated between the vibration electrodes and the stationary electrodes in the detection axis direction in FIGS. 1A and 1B, i.e., y axis direction, as given by following Eqs. (23) to (26).

$$F_{SVR1} = \epsilon_o \cdot n \cdot (L \cdot t/d_o^2) \cdot (V_{R1})^2 \qquad (23)$$

$$F_{SVR2} = -\epsilon_o \cdot n \cdot (L \cdot t/d_o^2) \cdot (V_{R2})^2 \qquad (24)$$

$$F_{SVL1} = -\epsilon_o \cdot n \cdot (L \cdot t/d_o^2) \cdot (V_{L1})^2 \qquad (25)$$

$$F_{SVL1} = -\epsilon_o \cdot n \cdot (L \cdot t/d_o^2) \cdot (V_{L2})^2 \qquad (26)$$

Where L: opposing length between the stationary and vibration electrodes.

By substituting Eqs. (8) to (11), the electrostatic attractive force generated in the y axis direction is given by $$F_{STotal} \approx \epsilon_o \cdot n(L \cdot t/d_o^2) \cdot V_{bias} \cdot K \cdot V_d \cdot 4a \cdot \sin \omega_1 t \qquad (27)$$

In addition, drive force generated in the drive axis direction, i.e., X axis direction can be given by rewriting above Eq. (13) in the following.

$$F_d \approx \epsilon_o \cdot n(L \cdot t/d_o^2) \cdot V_{bias} \cdot K \cdot 4V_d \cdot (1+b) \cdot \sin \omega_1 t \qquad (28)$$

If the drive axis direction and the detection axis direction are under resonance conditions, the Coriolis force generated and the electrostatic attractive force derived by Eq. (27) are in the same phase, and compensation of the Coriolis force is made feasible by adjusting only the modulation amount a of displacement information. Still further, if the drive amplitude of the vibration mass is varied by the influence of disturbance input, etc., the drive force can be changed like the above Eq. (28) by the modulation amount b concerning amplitude information to thus control the drive amplitude.

Furthermore, since Eqs. (27) and (28) are independent from each other with respect to the modulation amounts a, b, compensation of the Coriolis force and amplitude constant control of the vibration mass can be achieved by adjusting respective modulation amounts a, b independently.

In the controlling circuit 37 shown in FIG. 6A, the above drive voltage modulation can be carried out by inputting simultaneously amplitude information of the vibration mass and displacement information caused by the Coriolis force. As a result, uniformization of the drive amplitude and compensation of the Coriolis force can be attained at the same time, and detection can be realized with high precision by an angular velocity sensor with a simple structure.

Figure 14:
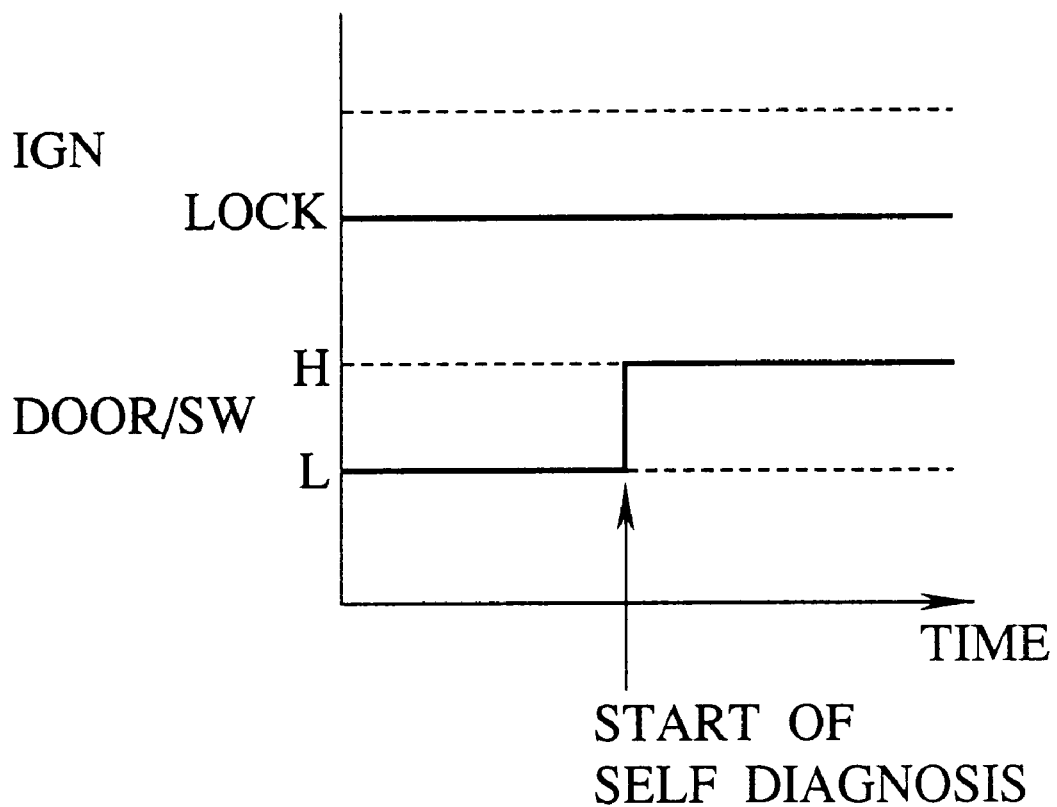
FIG. 14 is a timing chart illustrating a start timing of self-diagnosis in the angular velocity sensor according to the first embodiment of the present invention.

The angular velocity sensor of the present invention is suitable for rate gyroscope for vehicles. Self-diagnosis of the angular velocity sensor installed in a vehicle can be carried out at the time when the driver begins a starting of the vehicle from a stop state of the vehicle. The stop state of the vehicle is decided based on the fact that the ignition (IGN) key SW is in a lock state and the door lock SW on the driver's seat side is in an off state. Accordingly, as shown in FIG. 14, self-diagnosis of the gyroscope installed in the vehicle may be carried out at the timing when the ignition key SW is in a lock state and the door lock SW on the driver's seat side is switched from off to on. The timing of self-diagnosis operation can be determined by the controller 44. In self-diagnosis operation of the angular velocity sensor, modulation of the drive voltages V1, V2, V1−, V2− in the controlling circuit 37 is carried out as follows. Namely, in self-diagnosis operation, the switch 45 is switched by the control output from the controller 44, and the modulation amount a' of the drive voltage responding to deviation from the reference level in displacement information can be calculated by the arithmetic unit 411.

Therefore, if the drive voltage is modulated as expressed by Eqs. (9) to (12) and the modulation amount a' of the drive voltage is applied, a quasi Coriolis force $F'_c$ because of the electrostatic force can be generated as expressed in Eq. (29) without affecting the drive amplitude of the vibration mass.

$$F'_c \approx \epsilon_o \cdot n(L \cdot t/d_o^2) \cdot V_{bias} \cdot K \cdot V_d \cdot 4a' \cdot \sin \omega_1 t \qquad (29)$$

An output in self-diagnosis is proportional to the modulation amount a'. Because the output can be determined in compliance with the reference level set by the arithmetic unit, functions of electromechanical vibration system and the detection circuit in the detection direction can be diagnosed by monitoring the output. Diagnosis of the functions is effected by the controller 44 and the result is output as a decision output. If a plurality of reference levels are set, self-diagnosis function with higher precision can be achieved by switching respective reference levels according to the control output from the controller 44 and monitoring respective outputs using such reference levels.

As described earlier, in the first embodiment of the present invention, a self-diagnosis function of the angular velocity sensor can be achieved without requesting a newly additional structure, by generating the quasi Coriolis force in positive and negative directions along the detection axis with the use of compensation function of the Coriolis force to modulate the drive voltage and then monitoring the output corresponding to such quasi Coriolis force. Further, it would be checked by setting such quasi input value to an arbitrary value that displacement of the vibration mass along the detection axis direction can be assured in a desired range. As a result, the mulfunction of the angular velocity sensor can be prevented beforehand.

(Second Embodiment)

The basic configurations of the vibration mass and the related peripheral portions in an angular velocity sensor according to a second embodiment of the present invention are identical to those in the first embodiment. However, a controlling circuit 37 constituting a detection circuit of the angular velocity sensor has a configuration shown in FIG. 15, which is different from that in the first embodiment (see, FIG. 7). Only different portions of the second embodiment from the first embodiment will be discussed in the following.

Figure 15:
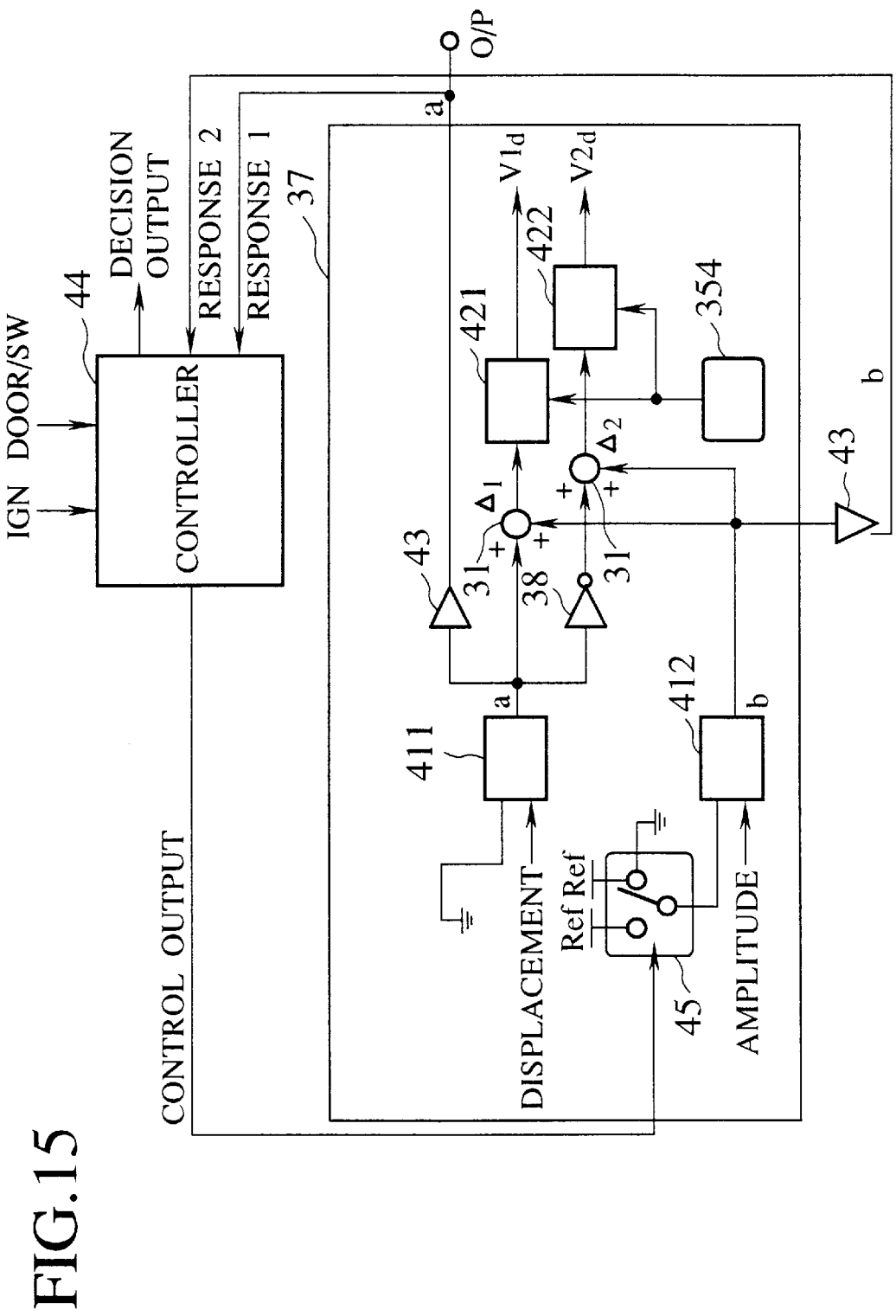
FIG. 15 is a block circuit diagram showing a detailed configuration of a controlling circuit in a detection circuit of an angular velocity sensor according to a second embodiment of the present invention.

In FIG. 15, displacement information and amplitude information are input into the arithmetic units 411, 412 respectively. In normal operation, the arithmetic unit 411 calculates the modulation amount of the drive voltage in response to a deviation from 0 level in displacement information, while the arithmetic unit 412 calculates the modulation amount of the drive voltage in response to a deviation from reference level in amplitude information of the vibration mass. In self-diagnosis operation, the arithmetic unit 412 calculates the modulation amount of the drive voltage in response to a deviation from differently set reference level in amplitude information of the vibration mass. In addition, the modulation amount a concerning displacement information to compensate the Coriolis force is output as an output 1 (response 1), while the modulation amount b concerning amplitude information to control the vibration amplitude is output as an output 2 (response 2).

Like the first embodiment of the present invention, self-diagnosis of the angular velocity sensor can be carried out at the time when the driver begins a starting of a vehicle from a stop state, if the angular velocity sensor is incorporated in a vehicle system. In self-diagnosis operation, modulation of the drive voltages V1, V2, V1-, V2- in the controlling circuit 37 is carried out as follows. To begin the self-diagnosis operation, the switch 45 is switched by the control output from the controller 44, and the arithmetic unit 412 calculates the modulation amount b' of the drive voltage responding to a deviation from the reference level, which being differently set from that in the normal operation, in displacement information. The drive voltage is modulated according to the modulation amount b' as given by Eqs. (9) to (12), and the drive force $F_d$ is changed by applying the modulation amount b' as indicated in following Eq. (30), without generating electrostatic force in the vibration mass in the detection axis direction. Thus the amplitude can be controlled to an amplitude different from that in normal operation.

$$F_d = \epsilon_o \cdot n(L \cdot t/d_o) \cdot V_{bias} \cdot K \cdot 4 V_d \cdot (1+b') \cdot \sin \omega_1 t \qquad (30)$$

The output 2 in self-diagnosis is proportional to the modulation amount b'. Since the output can be determined in compliance with the reference level set by the arithmetic unit, functions of electromechanical vibration system and the detection circuit in the drive axis direction can be diagnosed by monitoring the output. Diagnosis of the functions is carried out by the controller 44 and the result is output as a decision output. If a plurality of reference levels are set, self-diagnosis function with higher precision can be achieved by switching respective reference levels according to the control output from the controller 44 and monitoring respective outputs using such reference levels.

As described above, in the second embodiment of the present invention, the drive amplitude of the vibration mass can be controlled to the amplitude different from that in the normal operation. In particular, if the drive amplitude of the vibration mass can be controlled to the amplitude larger than that in the normal operation, obstacle to disturb peripheral vibration of the vibration mass can be detected in advance. For instance, in that event that the angular velocity sensor is applied to the vehicle and further self-diagnosis according to the second embodiment of the present invention is conducted directly after engine starting, functions of the vehicle can be diagnosed before the vehicle starts to run. As a result, reliability of the angular velocity sensor and the system equipped with the angular velocity sensor can be improved much more.

(Third Embodiment)

Figure 16A:
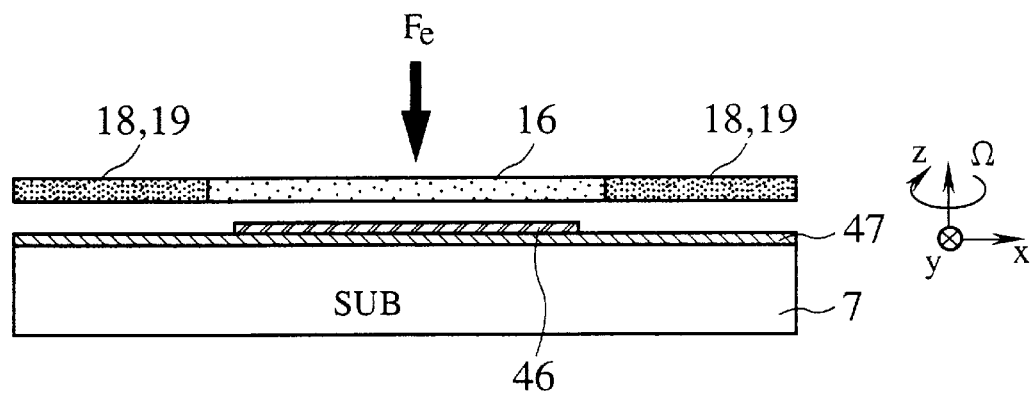
FIGS. 16A and 16B are schematic sectional views showing respectively a configuration around a vibration mass of an angular velocity sensor according to a third embodiment of the present invention.
Figure 16B:
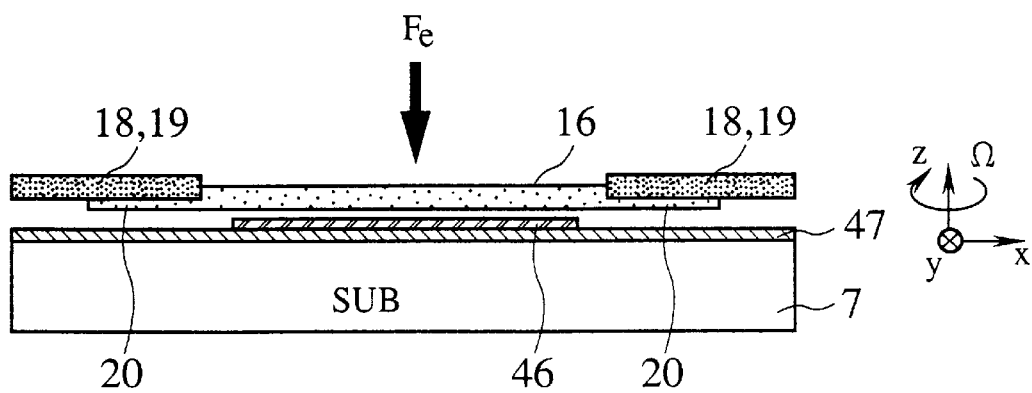

The basic configuration relating to a plan view showing the vibration mass and peripheral portion of the vibration mass in an angular velocity sensor according to a third embodiment of the present invention is substantially identical to those in the first and second embodiments, but sectional views of FIGS. 16A and 16B are partially different from those in the first and second embodiments. The vibration mass 16 is supported by supporting portions (not shown) on a silicon substrate 7 at a predetermined distance from the silicon substrate 7. An insulating film 47 such as an oxide film ($SiO_2$) is formed on a surface of the silicon substrate 7, and a quasi force applying electrode 46 is formed on the insulating film 47 and below the vibration mass 16 to contact with the insulating film 47. The comb electrodes serving as the vibration electrodes are formed to extend from the side surfaces of the vibration mass 16 similarly in FIG. 1A, but as shown in FIG. 16 the opposing stationary electrodes 18, 19 are formed to sandwich the vibration electrode (vibration drive electrode and/or vibration detection electrode).

Figure 17:
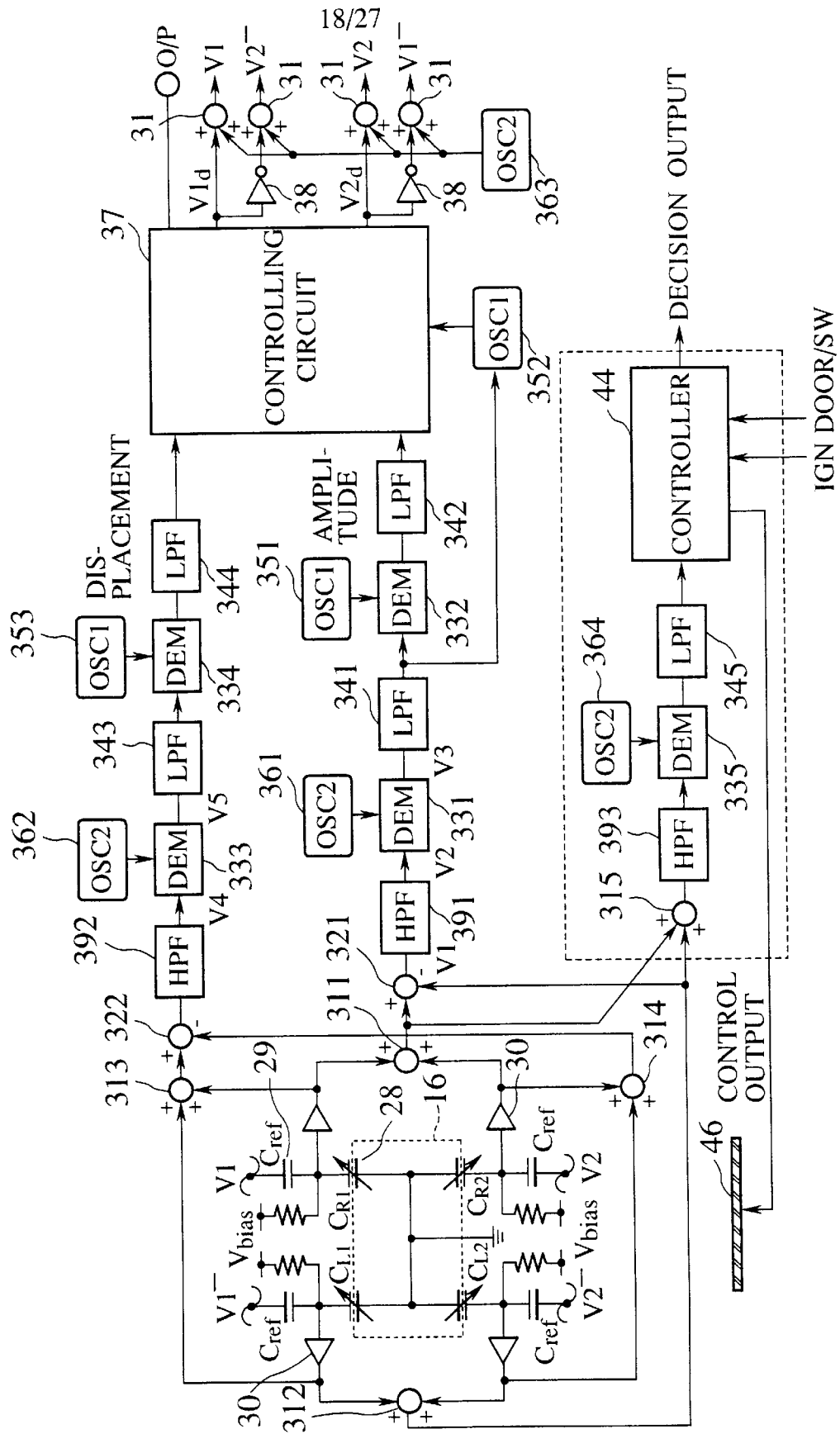
FIG. 17 is a circuit diagram showing a configuration of a detection circuit of the angular velocity sensor according to the third embodiment of the present invention.

The configuration of the detection circuit is substantially identical to that in FIG. 6A, but such operation is different from that in FIG. 6A in that a signal processing operation is added in self-diagnosis operation in partial. The signal processing circuit used in self-diagnosis operation is shown in FIG. 17. Only a different portion from the configuration in FIG. B indicated by a dotted line in FIG. 6A will be described. Self-diagnosis is carried out when an output of the oscillator (OSC1) 352 is turned off. Accordingly, the drive voltages V1, V2, V1-, V2- are an output from the oscillator (OSC2) 363 only. All the voltages $V_{R1}$, $V_{R2}$ and $V_{L1}$, $V_{L2}$ on the stationary electrodes R1, R2 and L1, L2 are added by the adders 311 and 312 respectively, and then outputs of the adders 311, 312 are added by an adder 315. Then an output of the adder 315 is input into a demodulator (DEM) 335 via a high-pass filter (HPF) 393 to be demodulated in synchronism with an output of an oscillator (OSC2) 364. A demodulation signal is input into a controller 44 via a low-pass filter (LPF) 345. A voltage is output as a control output from the controller 44 to a quasi input applying electrode 46.

In the case that the angular velocity sensor is incorporated in a vehicle, like the first embodiment of the present invention, self-diagnosis of the angular velocity sensor can be carried out at the time when the driver begins a starting of the vehicle from a stop state of the vehicle. Self-diagnosis is carried out when an output of the oscillator (OSC1) 352 is in an off state. As shown in FIG. 16A, an electrostatic force $F_e$ is applied to the vibration mass 16 by applying the voltage from the controller 44 to the quasi input applying electrode 46, so that, as shown in FIG. 16B, the vibration mass 16 is displaced toward the substrate. As a result, teeth of the comb electrodes (vibration electrode) 20 fixed to the vibration mass 16 are shifted relatively to the opposing stationary electrodes 17, 18 according to displacement of the vibration mass 16 to reduce electric capacitances $C_{R1}$, $C_{R2}$, $C_{L1}$, $C_{L2}$. Reduction in the electric capacitances $C_{R1}$, $C_{R2}$, $C_{L1}$, $C_{L2}$ can be measured by applying the output of the oscillator (OSC2) 363 to the drive voltages V1, V2, V1-, V2- and then demodulating the drive voltages V1, V2, V1-, V2− in synchronism with the outputs of the oscillators (OSC2) 363, 364. Therefore, a displacement amount of the vibration mass 16 can be detected from the demodulation amount. Thus a diagnose operation to determine whether or not the vibration mass 16 is supported by the supporting bodies in a movable state can be effected by monitoring the applied voltages and the displacement amount by virtue of the controller 44.

As described above, in the third embodiment, since the vibration mass 16 can displace in third axis direction, i.e., along the z axis, the supporting state of the vibration mass 16 can be diagnosed even if the output of the oscillator 352 is in an off state, i.e., the vibration ass 16 is not being vibrated. In addition, since the supporting state is examined by the relatively simple circuit shown in FIG. 17, the above procedures are applicable as a quality inspection method in manufacturing steps.

(Fourth Embodiment)

An angular velocity sensor according to a fourth embodiment of the present invention is substantially identical to those in the first to third embodiments except that a stopper (canopy structural body) is added to the vibration mass. And the electrode structure of the fourth embodiment is different from those of the previous embodiments.

Figure 18:
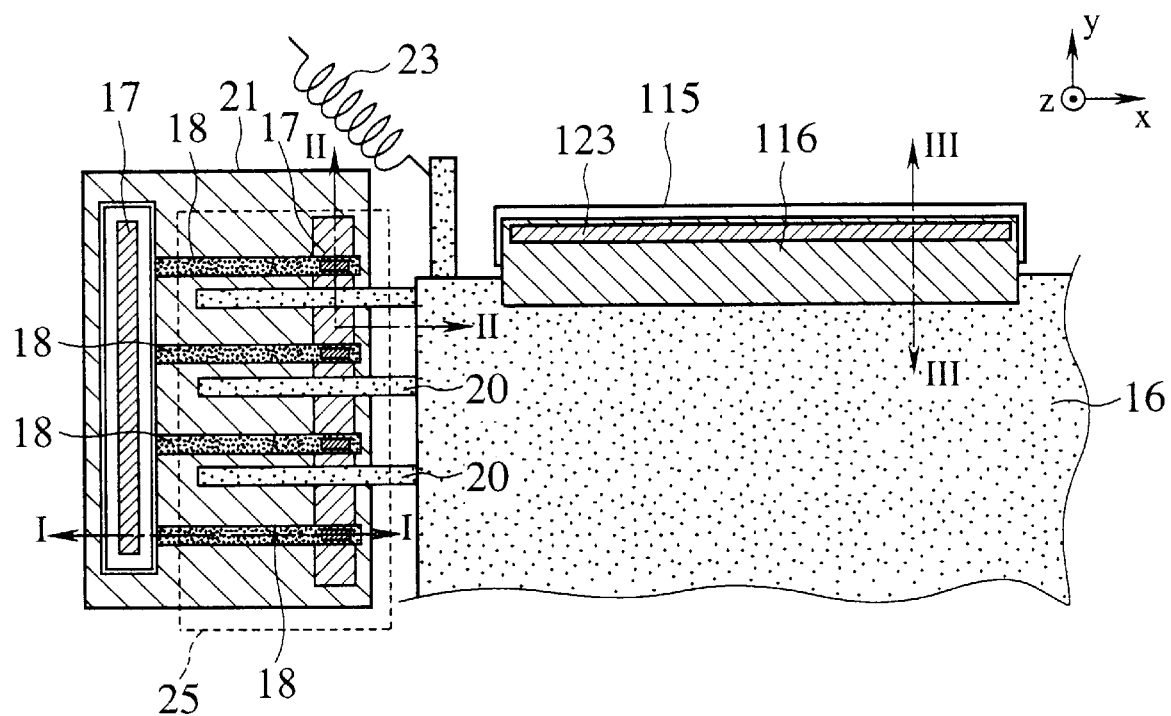
FIG. 18 is a schematic plan view showing a configuration in the neighborhood of a vibration mass of an angular velocity sensor according to a fourth embodiment of the present invention.
Figure 19A:
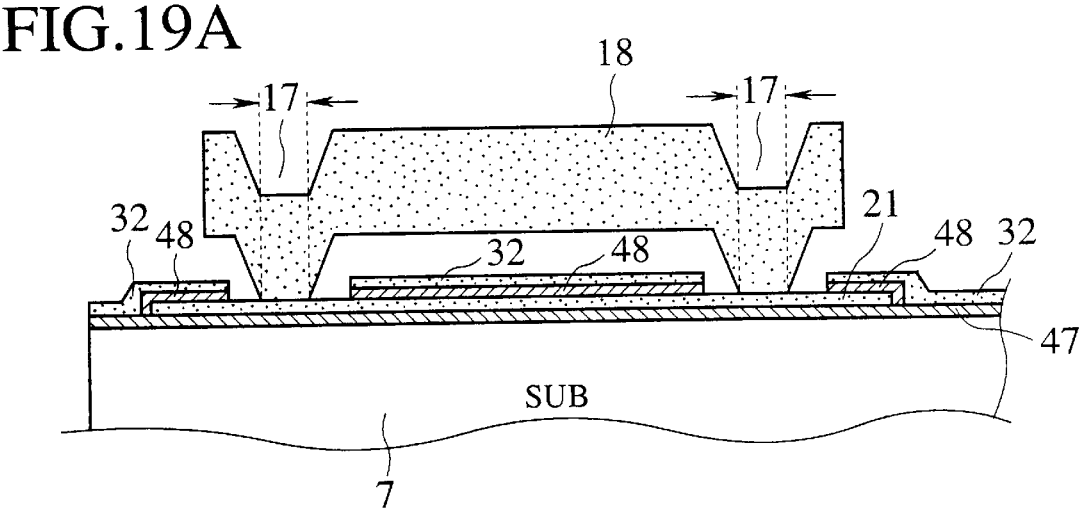
FIGS. 19A to 19C are sectional views respectively Cross-sectional shapes taken along lines I—I, II—II, and III—III in FIG. 18.
Figure 19B:
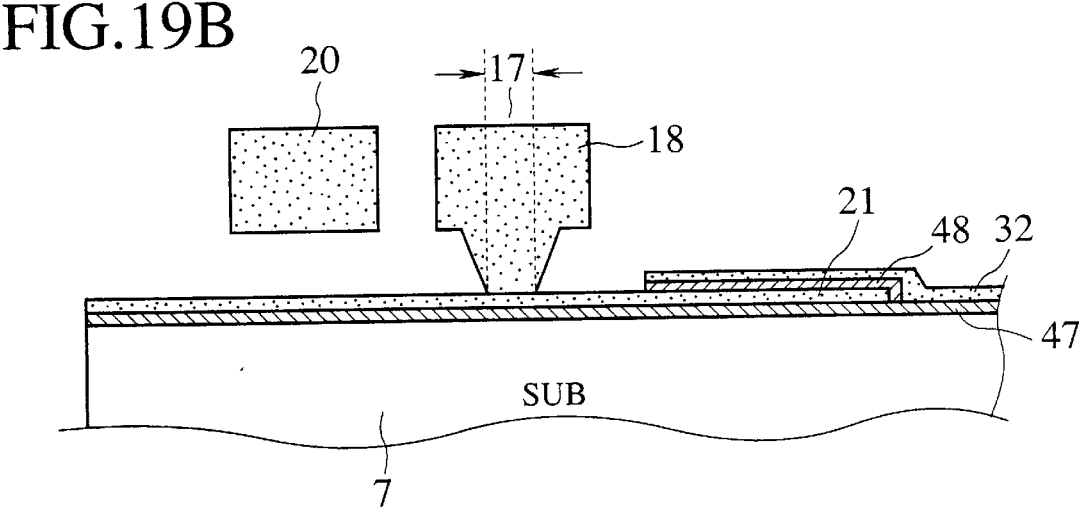
Figure 19C:
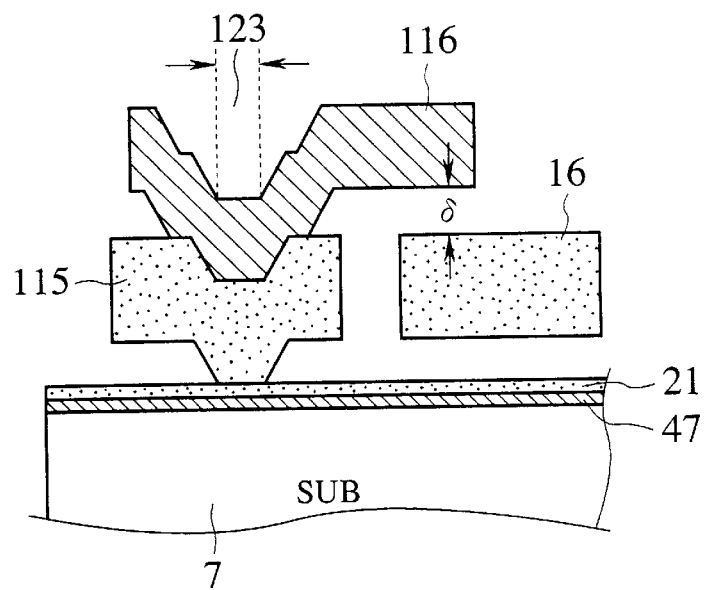

FIG. 18 is a schematic plan view showing the vibration mass 16, its peripheral electrode portions 25, etc. of the angular velocity sensor according to the fourth embodiment of the present invention. In the angular velocity sensor in FIG. 18, a semiconductor (silicon substrate) is used as a substrate and the vibration mass 16, the supporting portions 23 for supporting the vibration mass 16 to the substrate, and the electrode portions 25 are formed of polysilicon layers. The basic configuration of the electrode portions 25 is similar to those shown in FIG. 1B. A detailed configuration of the supporting portions 23 is a plate-like configuration similar to those in FIGS. 3B to 3E, 4A to 4C, 5A and 5B. In FIG. 18, the drive/detection electrode portion 25 consists of comb electrodes (vibration drive/detection electrodes) 20 extending from the side surfaces of the vibration mass 16, and comb electrodes (stationary drive/detection electrodes) 18 fixed to the silicon substrate. The stationary drive/detection electrodes 18 are connected to wiring portions 21 through the connection portions 17. The wiring portions 21 connect electrically peripheral circuit portions (not shown) with the stationary drive/detection electrodes 18. Respective teeth of the stationary drive/detection electrodes are formed as beams which are fixed to the silicon substrate at two connecting portions 17. A reference 115 is an anchor portion which is formed by the same structural body (polysilicon) as the vibration mass 16, the supporting portions 23, the stationary drive/detection electrodes 20, and the vibration drive/detection electrodes 18. A reference 116 is a canopy-like structural body which acts as a stopper and is fixed to the anchor portion 115 by the fixing portion 123. Cross-sectional shapes taken along lines I—I, II—II, and III—III in FIG. 18 are schematically shown in FIGS. 19A to 19C respectively. The same constituting portions in FIG. 18 are denoted by the same reference symbols in FIGS. 19A to 19C. A reference 7 denotes the silicon substrate. For the purposes of example, the wiring portions 21 are formed of polysilicon.

References 47, 48 denote oxide films (SiO$_2$ films) formed on the silicon substrate 7 and polysilicon respectively. A reference 32 denotes a polysilicon layer as the second layer which has been omitted in FIG. 18 for simplicity of illustration.

Next, manufacturing procedures of the angular velocity sensor according to the fourth embodiment of the present invention will be explained with reference to FIGS. 20A to 20H and FIGS. 21A to 21J. FIGS. 20A to 20H show manufacturing steps in cross-sectional views which corresponding to the cross-sectional portion shown in FIG. 19A.

Figure 20A:
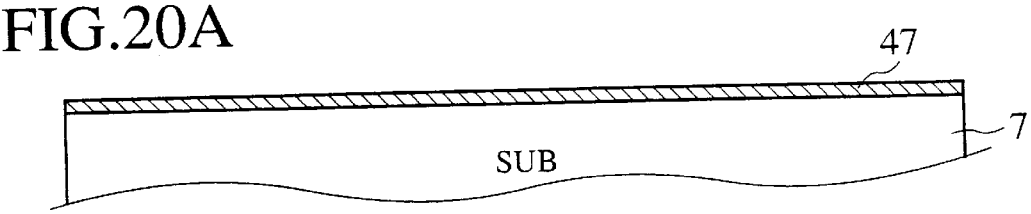
FIGS. 20A to 20H are cross-sectional views showing manufacturing steps of the angular velocity sensor according to the fourth embodiment of the present invention, which corresponding to the cross-sectional portion shown in FIG. 19A.

(a) As shown in FIG. 20A, the silicon substrate 7 is oxidized to form the oxide film (SiO$_2$ film) 47.

Figure 20B:
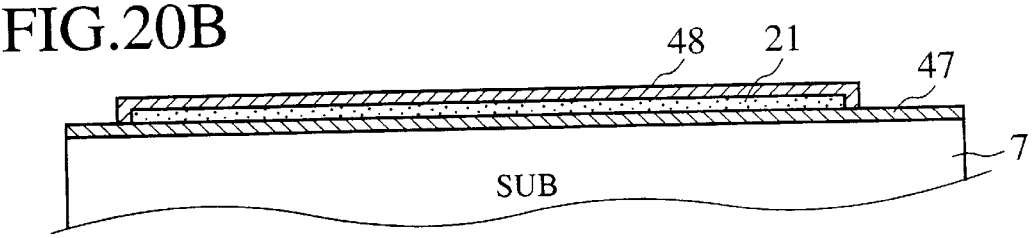

(b) As shown in FIG. 20B, the polysilicon 21 is stacked by the CVD method to form the wiring portions. In turn, the polysilicon 21 is patterned by the photolithography method and the RIE method to have shapes of the wiring portions 21, and then a surface of the polysilicon 21 is oxidized to form the oxide film 48.

Figure 20C:
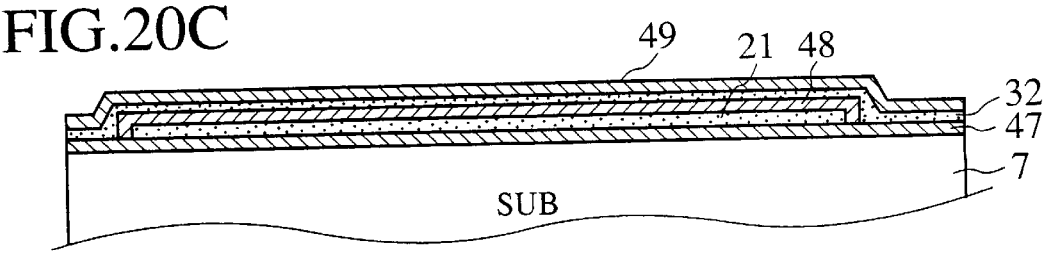

(c) As shown in FIG. 20C, a polysilicon layer 32 as the second layer is stacked by the CVD method, and then a surface of the polysilicon layer 32 is thermally oxidized to form the oxide film 49.

Figure 20D:
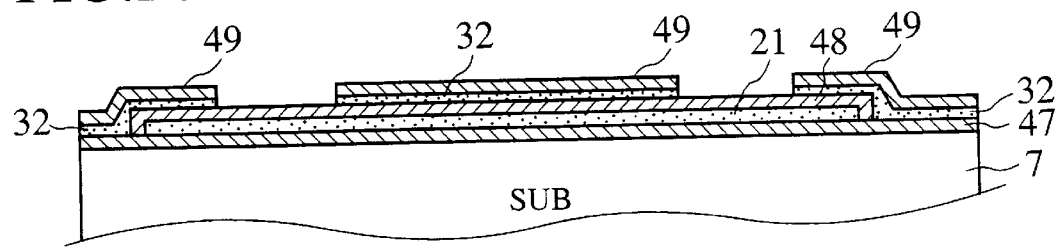

(d) As shown in FIG. 20D, the oxide film 49 and the polysilicon layer 32 are patterned by the photolithography method and the RIE method.

Figure 20E:
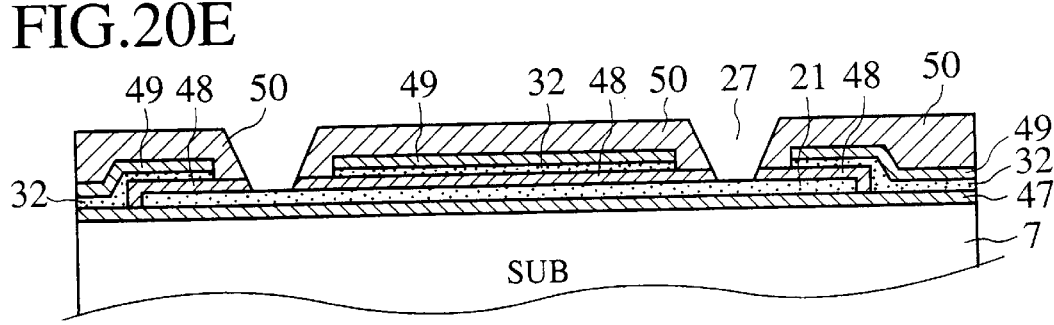

(e) As shown in FIG. 20E, a sacrificial oxide film 50 is stacked on an entire surface by the CVD method. Then, in order to form the connection portions 17 between the electrodes and the wiring portions 21, contact holes 27 are formed by removing the sacrificial oxide film 50 and the oxide film 48 by means of the photolithography method and the RIE method.

Figure 20F:
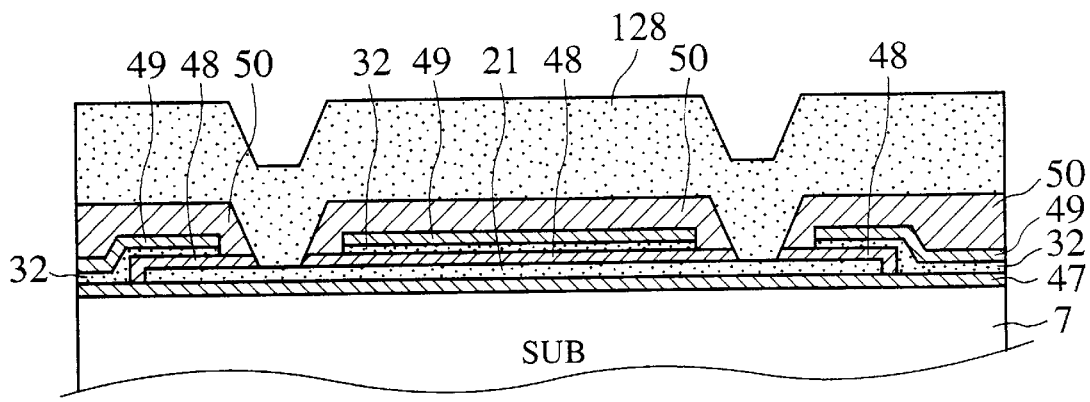

(f) As shown in FIG. 20F, a polysilicon layer 128 to be formed as structural bodies serving as the vibration mass, the supporting portions, and the electrodes is stacked by the CVD method. Preferably, a thickness of the polysilicon layer 128 is about 2 to 5 $\mu$m.

Figure 20G:
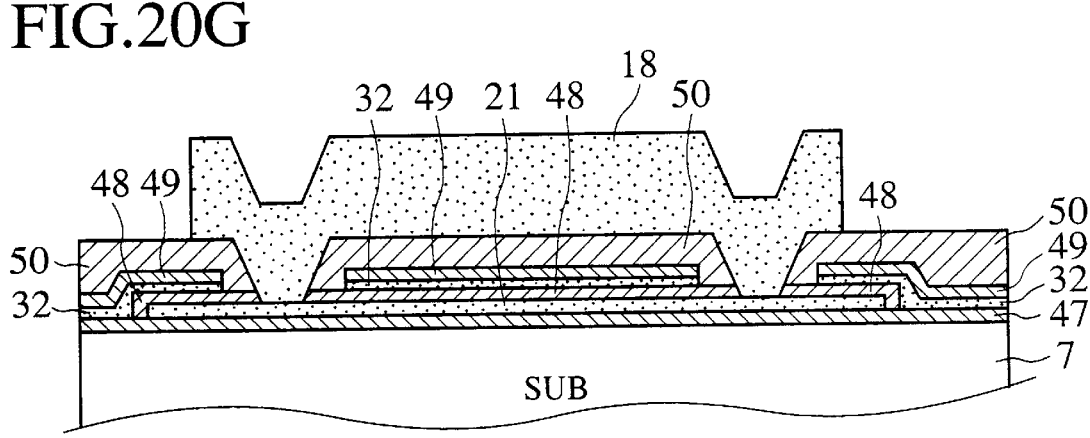

(g) As shown in FIG. 20G, comb-shaped stationary drive electrodes 18 are formed by patterning the polysilicon layer 128 by using the photolithography method and the RIE method.

Figure 20H:
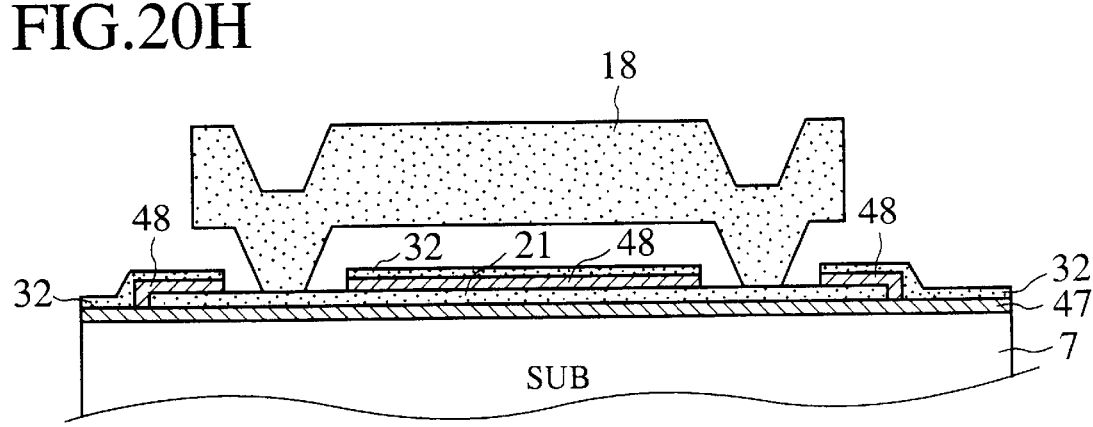

(h) With the use of etching solution of acid such as mixed solution of ammonium fluoride (NH$_4$F) and hydrogen fluoride (HF), the sacrificial oxide film 50 and the oxide film 40 are removed and a structural body is formed, as shown in FIG. 20H.

After this, an oxide film is formed as a passivation film and then windows are formed in the passivation film to form pads used for wire bonding. If a resultant structure is mounted on predetermined lead frame or the substrate and then assembled by wire bonding, for example, the angular velocity sensor according to the fourth embodiment of the present invention has been completed. As described later with reference to FIGS. 21A to 21J, actually the passivation film and the sacrificial oxide film 50 can be removed simultaneously by etching.

FIGS. 21A to 21J show manufacturing steps in cross-sectional views which corresponding to the cross-sectional portion shown in FIG. 19A.

Figure 21A:
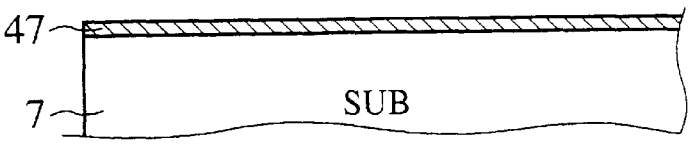
FIGS. 21A to 21J are cross-sectional views showing manufacturing steps of the angular velocity sensor according to the fourth embodiment of the present invention, which corresponding to the cross-sectional portion shown in FIG. 19C.
Figure 21B:
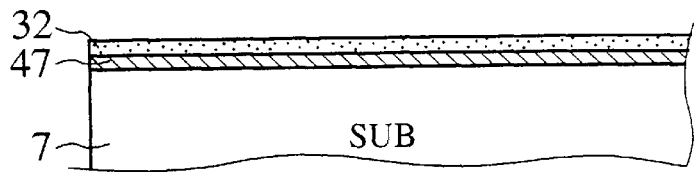
Figure 21C:
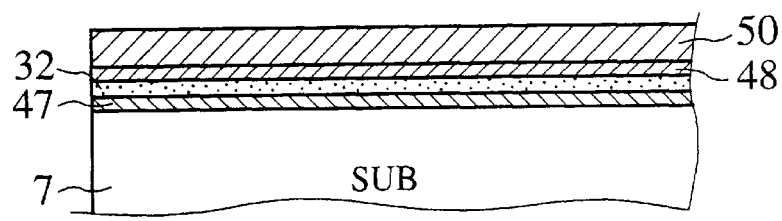
Figure 21D:
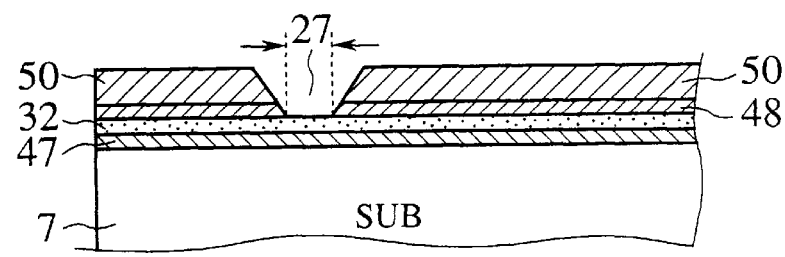
Figure 21E:
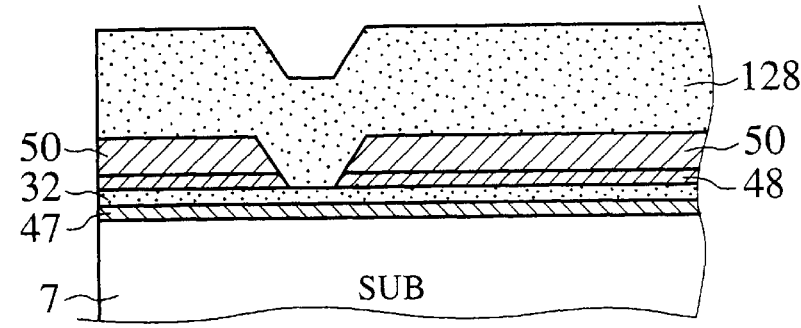

(a) FIGS. 21A to 21E correspond to steps in FIGS. 20A to 20F and the descriptions thereof are omitted. In the following explanation, as shown in FIG. 21E, manufacturing steps will be explained after the polysilicon layer 128 is stacked on the sacrificial oxide film 50 over an entire surface.

Figure 21F:
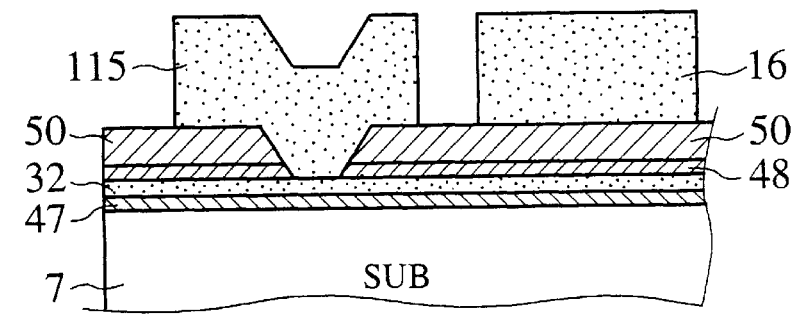
Figure 21G:
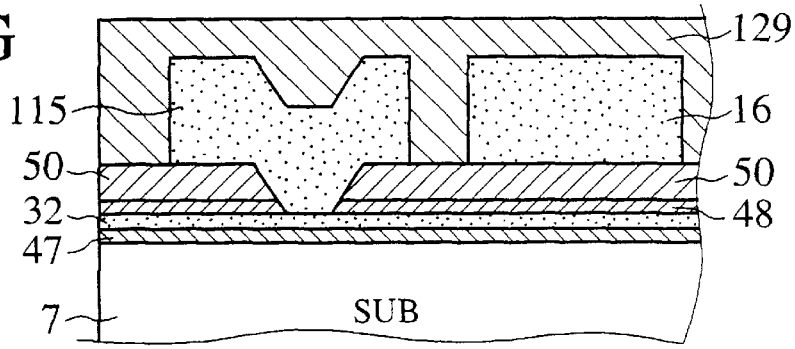

(b) As shown in FIG. 21F, the polysilicon layer 128 for structural body is patterned by the photolithography method and the RIE method to form the vibration mass 16 and the anchor portion 115. Thereafter, as shown in FIG. 21G, an oxide film 129 such as $SiO_2$, PSG, BPSG is stacked to planarize a surface and to form the passivation film. For planalization, reflow of PSG film, BPSG film may be used or SOG (Spin-on-glass) method may be used. CMP (Chemical Mechanical Polishing) may be used as the case may be.

Figure 21H:
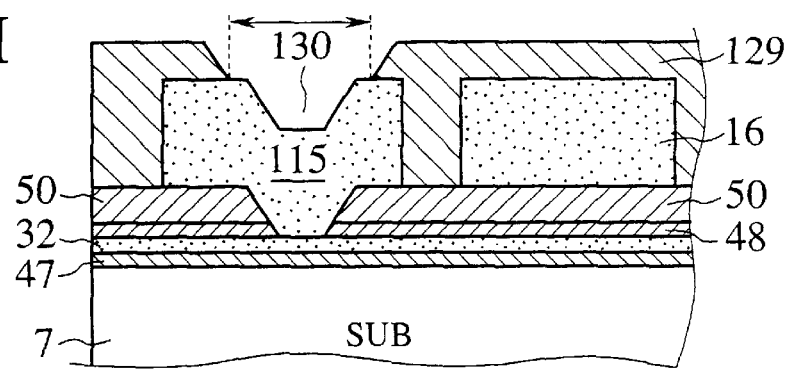

(c) As shown in FIG. 21H, the oxide film 129 on the anchor portion 115 is removed by the photolithography method and the RIE method to form contact holes 130. Although not shown, it is preferable that the oxide film 129 on the metal electrode is also removed at this time to open pad forming window portions.

Figure 21I:
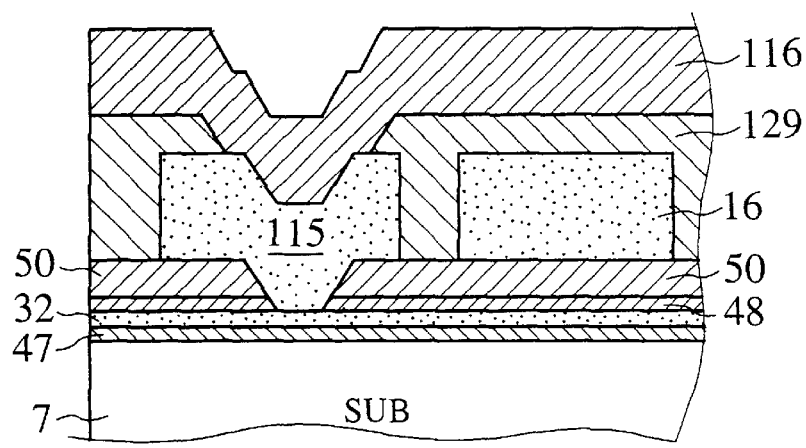

(d) As shown in FIG. 21I, the silicon nitride ($Si_3N_4$) film 116 for the passivation film as well as the stopper are stacked by the CVD method on the anchor portion 115, the oxide film 129, and the metal electrode.

Figure 21J:
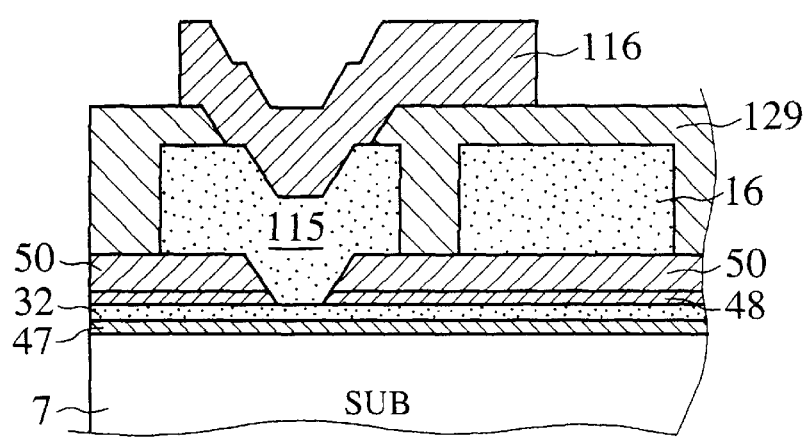

(e) As shown in FIG. 21J, the canopy-like structural body 116 serving as a stopper is formed by patterning the silicon nitride film 116 by RIE using etchant gas such as $CF_4$, $C_3F_5$. As a patterning mask for the canopy-like structural body, the mask used to remove the passivation film 116 on the bonding pads can be commonly used. Hence, the windows to from the wire bonding pads can be opened at the same time.

(f) Then, With the use of etchant such as hydrogen fluoride (HF) aqueous solution or mixed solution of ammonium fluoride ($NH_4F$)/hydrogen fluoride (HF), the sacrificial oxide film 50 and the planarizing oxide film 129 are removed from a structure shown in FIG. 21J. Then, the stopper is formed to limit displacement of the vibration mass 16 in the normal direction of the substrate, and the angular velocity sensor according to the fourth embodiment of the present invention shown in FIG. 19C has been completed.

In the above process, although the silicon nitride film has been used as material of the canopy-like structural body 116 constituting the stopper, other stacked film such as polysilicon film may be used as structural material.

As shown in FIG. 19A, in the fourth embodiment of the present invention, the stationary drive electrode 18 fixed to the silicon substrate 7 has been formed as a beam structure wherein the beam 18 is fixed to the substrate at two end locations, and its rigidity can be improved in contrast to the cantilever structure used in the conventional angular velocity sensor. For instance, if both structures are compared at their maximum displacement, rigidity of the double edge fixed beam structure can be increased eight times rather than the cantilever beam structure in the displacement on the plane including the x, y axes shown at upper right corner in FIG. 18 (in this comparison the length of the both beams is settled as a constant). In addition, as shown in FIG. 19C, displacement of the vibration mass 16 along the normal direction to the substrate surface is limited by the stopper constituted by the canopy-like structural body 116. Rigidity of the stopper can be determined depending upon material, shape, and number of the canopy-like structural body 116. The comb electrodes (vibration drive/detection electrodes) 20 extending from the side surfaces of the vibration mass 16 are formed as the cantilever structure which is supported by the vibration mass 16. However, if a distance δ (see, FIG. 19C) between the vibration mass 16 and the canopy-like structural body 116 is set less than a thickness of the vibration mass 16 and rigidity of the stopper is set to a desired value, the vibration drive/detection electrodes 20 can be protected from being damaged by a large-scale input such as impact caused by the falling down of the sensor. This is because, in the structure of the fourth embodiment of the present invention, maximum relative displacements of the vibration drive/detection electrodes 20 extending from the side surfaces of the vibration mass 16 and the stationary drive/detection electrodes 18 fixed to the substrate can be suppressed. Hence, so-called "miss steps" such as bending of the comb electrodes can be prevented. Since miss steps between the vibration and stationary drive/detection electrodes are not generated against the large-scale input such as impact caused by the falling down of the sensor and reduction in yielding in assembling steps can be prevented, an inexpensive gyroscope can be achieved with high reliability. The vibration and stationary drive/detection electrodes can serve as the vibration and stationary detection electrodes, respectively, at the same time.

In the fourth embodiment of the present invention, although the case has been explained wherein the vibration mass 16, the supporting portions 23, the comb electrodes 18, 20, the anchor portion 115, and the canopy-like structural body 116 are formed of polysilicon, these the vibration mass 16, the supporting portions 23, etc. may be formed of metal stacked by electroplating, as evident from sectional views showing manufacturing steps in FIGS. 20A to 20H and FIGS. 21A to 21H. In other words, in place of the CVD of the polysilicon 128 shown in FIG. 20F and FIG. 21E, the structure shown in FIG. 20H may be formed if a metal is stacked by electroplating, then the metal is patterned into predetermined patterns shown in FIGS. 20G and 21F, then the sacrificial oxide film 50, etc. are selectively removed. It would be easily understood that, if such approach is employed that a single crystal silicon film instead of the polysilicon film shown in FIGS. 20F and 21E is bonded via the sacrificial oxide film with the use of the direct bonding method (SDB method), the vibration mass, etc. can be formed of the single crystal silicon film.

(Fifth Embodiment)

Figure 22A:
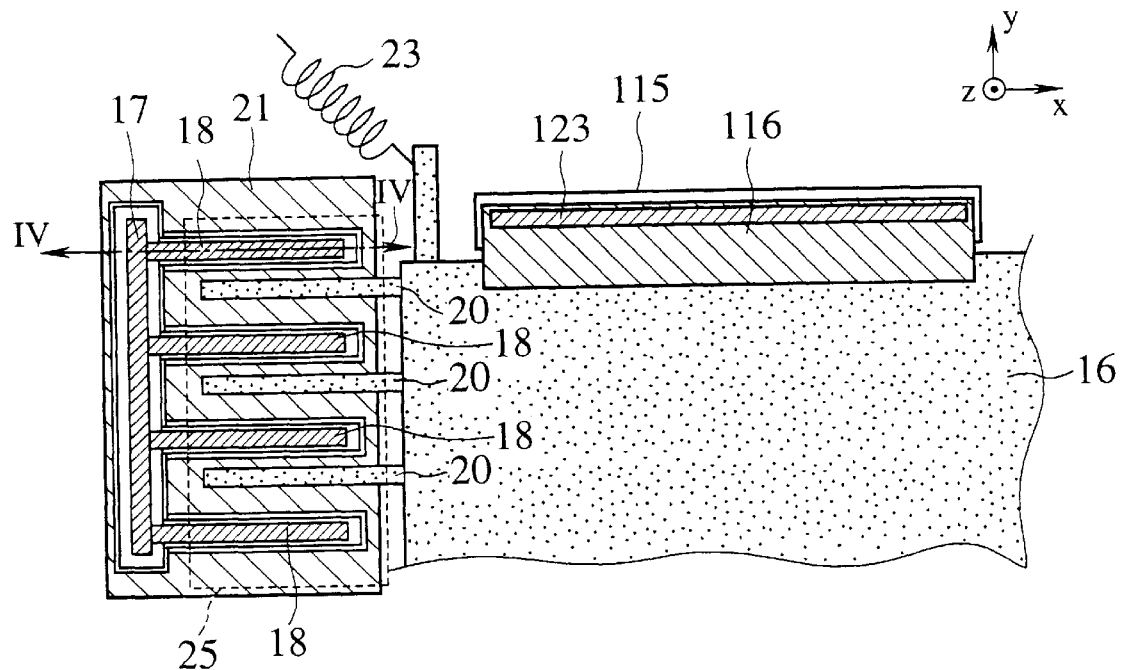
FIG. 22A is a schematic plan view showing a configuration in the neighborhood of a vibration mass of an angular velocity sensor according to a fifth embodiment of the present invention.

A schematic plan view of the vibration mass 16, the supporting portions 23 for supporting the vibration mass 16 on the substrate, and the electrode portions 25 in an angular velocity sensor according to a fifth embodiment of the present invention is shown in FIG. 22A. A sectional view taken along a line IV—IV in FIG. 22A is shown in FIG. 22B

In the angular velocity sensor according to a fifth embodiment of the present invention, the semiconductor substrate (silicon substrate) 7 is used as the substrate and the vibration mass 16, the supporting portions 23, and the electrode portions 25 are made of polysilicon layer. For the detailed structure of the supporting portions 23, a thickness is set constant and a plan shape is similar to those in FIGS. 3B to 3E, FIGS. 4A to 4C, FIGS. 5A and 5B. The vibration mass 16, the supporting portions 23, etc. may be formed by the single crystal silicon layer or the metal layer stacked by electroplating in place of polysilicon layer.

Figure 22B:
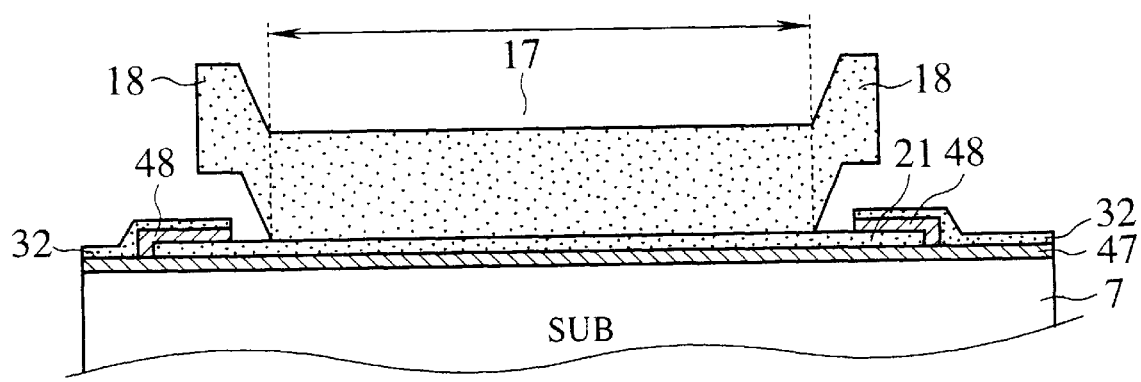
FIG. 22B is a sectional view showing a cross-sectional shape taken along a line IV—IV in FIG. 22A.

As shown in FIG. 22B, the angular velocity sensor according to the fifth embodiment of the present invention is characterized in that, on the silicon substrate 7, the comb electrodes for stationary drive electrodes 18 are contacted to the wiring portions 21 and fixed thereto over substantially full area 17 in the longitudinal direction of the stationary drive/detection electrodes 18. Since other structures such as the canopy-like structural body 116, etc. are the same as those in the fourth embodiment, their explanations will be omitted. Furthermore, since manufacturing steps for the angular velocity sensor according to the fifth embodiment of the present invention are substantially identical to those in the fourth embodiment, their explanations will be omitted.

In the fifth embodiment of the present invention, the comb electrodes 18 to be fixed to the silicon substrate 7 are fixed over the substantially full area 17 along the longitudinal direction and therefore their rigidity can be improved rather than the cantilever structure in the conventional angular velocity sensor. The fifth embodiment of the present invention having the stopper 116 can achieve effects and advantages similar to the fourth embodiment, nevertheless reliability can be improved rather than the fourth embodiment because rigidity of the stationary drive electrodes 18 to be fixed to the silicon substrate 7 can be increased still more. The stationary drive electrodes can serve as the stationary detection electrodes. And the vibration drive electrodes 20 fixed to the vibration mass 16 act as the vibration detection electrodes in that case.

(Sixth Embodiment)

Figure 23:
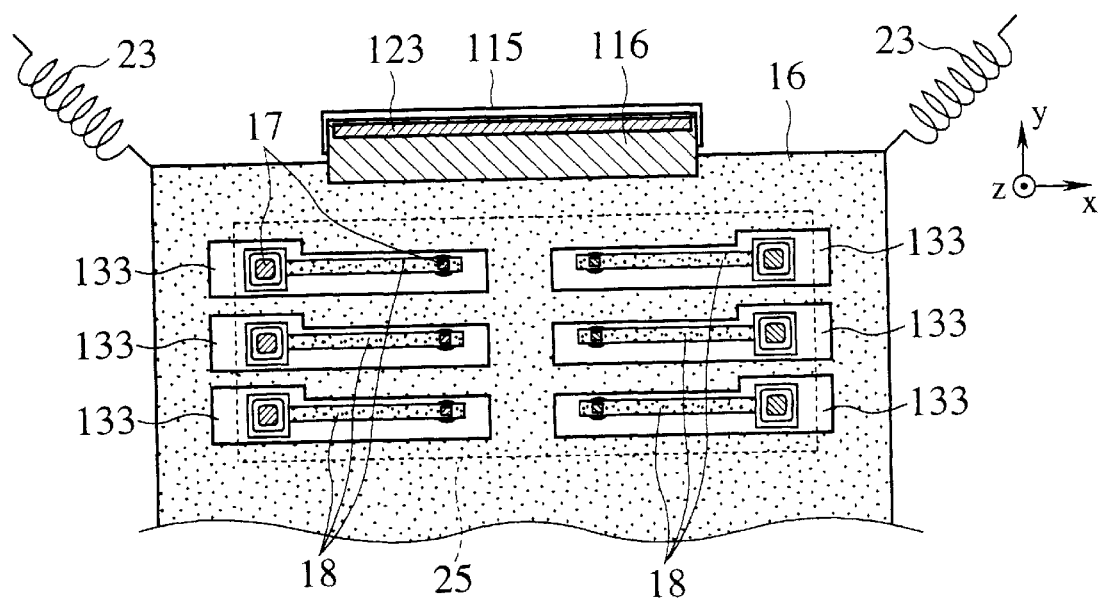
FIG. 23 is a schematic plan view showing a configuration of a vibration mass and electrode portions of an angular velocity sensor according to a sixth embodiment of the present invention.

FIG. 23 shows a schematic plan view of the vibration mass 16, the supporting portions 23 for supporting the vibration mass 16 on the silicon substrate, and the electrode portions 25 in an angular velocity sensor according to a sixth embodiment of the present invention. Though the supporting portions 23 are shown schematically, a detailed structure is similar to those in FIGS. 3B to 3E, FIGS. 4A to 4C, FIGS. 5A and 5B.

Figure 24:
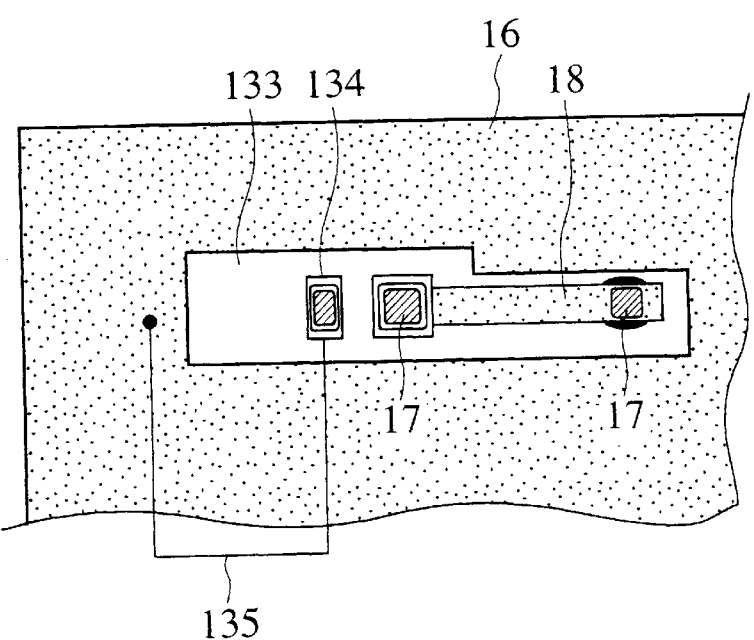
FIG. 24 is a schematic plan view showing a configuration wherein shielding electrodes are provided to the angular velocity sensor according to the sixth embodiment of the present invention.

In the sixth embodiment of the present invention, the semiconductor substrate (silicon substrate) 7 is used as the substrate and the vibration mass 16, the supporting portions 23, and the electrode portions 25 are made of polysilicon layer. The sixth embodiment of the present invention is characterized in that cavities 133 are formed in the vibration mass 16, then the comb electrodes 18 serving as the stationary drive electrodes and/or the stationary detection electrodes fixed to the silicon substrate by two connection portions 17 are arranged to be included in the cavities 133, and then the drive (and/or detection) electrodes 25 are constituted by inner walls of the cavities 133 and the comb electrodes 18 fixed to the silicon substrate. In addition, if unnegligible influence of the electrostatic attractive force is generated along the x axis direction with applying drive voltages, such influence can be eliminated if shielding electrodes 134 are added as shown in FIG. 24 to be made equipotential to the vibration mass 16 via short-circuiting wirings 135. Since manufacturing steps for the angular velocity sensor according to the sixth embodiment of the present invention are substantially identical to those in the fourth embodiment, their explanations will be omitted.

In the sixth embodiment of the present invention, the comb electrodes 18 to be fixed to the silicon substrate 7 like the fourth embodiment are formed as the beam structure which is fixed to the silicon substrate at two location and therefore their rigidity can be improved rather than the cantilever structure used in the conventional angular velocity sensor. Moreover, since the inner walls of the cavities 133 are used as the opposing vibration drive electrodes and/or vibration detection electrodes to the fixed comb electrodes 18, rigidity of the opposing electrodes can be improved in comparison with the first to fifth embodiments. In particular, since, like the fourth and fifth embodiments, the sixth embodiment of the present invention has the canopy-like structural body 116 serving as the stopper, advantages obtained similarly by the fourth and fifth embodiments can be achieved such that displacement along the normal direction to the principal surface of the substrate can be limited and thus miss steps between the vibration and stationary drive (detection) electrodes are not caused. As a result, reliability can be improved rather than the fourth and fifth embodiments.

(Seventh Embodiment)

Figure 25:
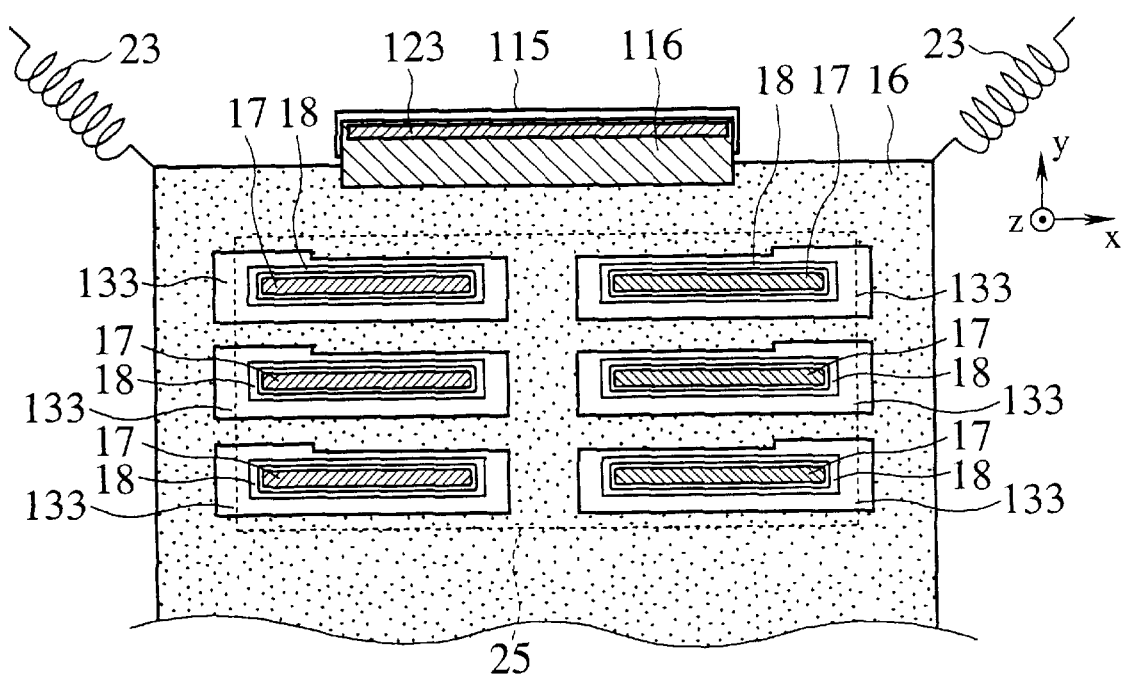
FIG. 25 is a schematic plan view showing a configuration of a vibration mass and electrode portions of an angular velocity sensor according to a seventh embodiment of the present invention.

FIG. 25 shows a schematic plan view of the vibration mass 16, the supporting portions 23 for supporting the vibration mass 16 on the silicon substrate, and the electrode portions 25 in an angular velocity sensor according to a seventh embodiment of the present invention. Though the supporting portions 23 are shown schematically, a detailed structure may be formed as a plate-like structure which has any of plan shapes similar to those in FIGS. 3B to 3E, FIGS. 4A to 4C, FIGS. 5A and 5B and a constant thickness.

In the seventh embodiment of the present invention, the semiconductor substrate (silicon substrate) is used as the substrate and the vibration mass 16, the supporting portions 23, and the electrode portions 25 are formed of a polysilicon layer. Cavities 133 are formed in the vibration mass 16 of the angular velocity sensor according to the seventh embodiment of the present invention. The seventh embodiment of the present invention is characterized in that the comb electrodes 18 which are fixed to the silicon substrate via wiring portions (not shown) over a substantially full area 17 along the longitudinal direction are arranged to be included in the cavities 133. And then the drive (and/or detection) electrodes 25 are constituted by inner walls of the cavities 133 and the comb electrodes 18 fixed to the silicon substrate. In addition, if unnegligible influence of the electrostatic attractive force is generated along the x axis direction with applying drive voltages, such influence can be eliminated by adding the shielding electrodes 134, like FIG. 24. With the shielding electrodes 134, the potential of the stationary drive (detection) electrodes are made equipotential to the vibration mass 16 via short-circuiting wirings 135. Since other structures such as the stopper 116, etc. and manufacturing steps are substantially identical to those in the fourth embodiment, their explanations will be omitted.

Although operations achieved by the angular velocity sensor according to the seventh embodiment of the present invention are similar to those in the sixth embodiment, comb type electrodes 18 fixed to the silicon substrate has a structure which is fixed over a substantially whole region 17 in its longitudinal direction in the seventh embodiment, so that a rigidity of the angular velocity sensor can be further improved in contrast to the sixth embodiment. In addition, the seventh embodiment of the present invention can achieve advantages similar to those in the sixth embodiment, and reliability of the angular velocity sensor in the seventh embodiment can be further improved rather than the angular velocity sensor in the sixth embodiment since a rigidity of the comb type stationary drive (detection) electrodes 18 to be fixed can be increased further more.

Various modifications will become possible for those skilled in the art after receiving the teachings of the present disclosure without departing from the scope thereof. For instance, a pair of angular velocity sensors set forth in any of the above first to seventh embodiments may be selected such that respective vibration masses in the angular velocity sensors are driven to vibrate in opposite phase in the direction along the first axis. In this event, Coriolis forces $F_{c1}$, $F_{c2}$ affecting to respective vibration masses are expressed by Eq. (1). Since $V_m(t)$'s of respective vibration masses have always opposite signs, the Coriolis forces $F_{c1}$, $F_{c2}$ generated have always opposite signs. Therefore, if an angular velocity around the third axis is measured based on difference between outputs of respective vibration masses detected in the direction along the second axis, the angular velocity sensor with high precision can be achieved. In this case, acceleration generated in the direction along the second axis can also be measured from a sum of the outputs detected in the direction along the second axis.

What is claimed is:

1. An angular velocity sensor comprising:
   (a) a substrate;
   (b) a vibration mass positioned separate from said substrate in such a manner that said vibration mass is made possible to vibrate in at least a direction parallel to a principal surface of said substrate;
   (c) at least two plate-like supporting portions positioned symmetrically with respect to a direction bisecting an angle between a first axis and a second axis both constituting an orthogonal coordinate system on a surface which is parallel to said principal surface of said substrate and includes said first axis and said second axis, said at least two plate-like supporting portions having equal spring constants in directions along said first axis and said second axis, and one end of each of said at least two plate-like supporting portions being fixed to said vibration mass and other end thereof being fixed to said substrate;
   (d) drive electrodes consisting of vibration drive electrodes fixed to said vibration mass and stationary drive electrodes fixed to said substrate;
   (e) detection electrodes consisting of vibration detection electrodes fixed to said vibration mass and stationary detection electrodes fixed to said substrate;
   (f) driving means for driving said vibration mass to vibrate in said first axis direction by supplying voltage to said drive electrodes; and
   (g) detecting means for detecting voltage derived by said detection electrodes and detecting a Coriolis force caused in a direction along said second axis by rotation around a third axis perpendicular to said principal surface of said substrate.

2. The angular velocity sensor of claim 1, wherein each of said at least two plate-like supporting portions comprises a plurality of elastic structural bodies which are aligned symmetrically with respect to said direction bisecting said angle between said first axis and said second axis.

3. The angular velocity sensor of claim 1, wherein said vibration drive electrodes and stationary drive electrodes are opposed to each other in said direction along said first axis to constitute parallel plate type capacitors.

4. The angular velocity sensor of claim 1, wherein said vibration detection electrodes and stationary detection electrodes are opposed to each other in said direction along said first axis to constitute parallel plate type capacitors.

5. The angular velocity sensor of claim 3, further comprising:
   drive controlling means for detecting vibration amplitude in a drive state of said vibration mass, and controlling vibration amplitude in said direction along said first axis to be kept constant.

6. The angular velocity sensor of claim 4, further comprising:
   reference electric capacitors connected to said stationary detection electrodes;
   wherein reading signals are input to said stationary detection electrodes via said reference electric capacitors, and displacement of said vibration mass is detected according to signals generated by said stationary detection electrodes.

7. The angular velocity sensor of claim 5, further comprising:
   reference electric capacitors connected to said stationary drive electrodes;
   wherein drive voltage is input to said stationary drive electrodes via said reference electric capacitors, and vibration amplitude is detected according to voltage generated by said stationary drive electrodes and drive voltage is controlled by said drive controlling means to keep said amplitude constant.

8. The angular velocity sensor of claim 1, wherein said substrate is formed of a semiconductor substrate, and said vibration mass and said at least two plate-like supporting portions are formed of a polysilicon.

9. The angular velocity sensor of claim 8, wherein said driving means and said detecting means are integrated on a same semiconductor substrate.

10. The angular velocity sensor of claim 1, wherein said substrate, said vibration mass, and said at least two plate-like supporting portions are formed of a single crystal semiconductor.

11. The angular velocity sensor of claim 1, wherein said substrate is formed of a semiconductor substrate, and said vibration mass and said at least two plate-like supporting portions are formed of a metal stacked by electroplating.

12. The angular velocity sensor of claim 10, wherein said driving means and said detecting means are integrated on a same semiconductor substrate.

13. The angular velocity sensor of claim 11, wherein said driving means and said detecting means are integrated on a same semiconductor substrate.

14. The angular velocity sensor of claim 1, wherein a pair of angular velocity sensors set forth in claim 1 are provided such that respective vibration masses are driven in opposite phase, and an angular velocity of rotation around a third axis is measured based on a difference between outputs detected in a direction along said second axis and an acceleration in a direction along said second axis is measured based on a sum of said outputs detected in said direction along said second axis.

15. The angular velocity sensor of claim 1, wherein said drive electrodes consisting of at least four electrode pairs, each electrode pair consisting of said vibration drive electrodes and said stationary drive electrodes, and at least two electrode pairs among said four electrode pairs are caused to vibrate in a direction along said first axis by electrostatic attractive force generated by applying simultaneously drive voltages V1, V2 to said at least two electrode pairs, and then, under an assumption that electrostatic capacitances between said at least two electrode pairs are set to C1 and C2 respectively, information concerning vibration amplitude of said vibration mass in said direction along said first axis is detected based on a sum of said electrostatic capacitances C1 and C2 and information concerning displacement of said vibration mass caused by said Coriolis force in said direction along said second axis is detected based on a difference between said electrostatic capacitances C1 and C2.

16. The angular velocity sensor of claim 15, further comprising:

compensating means for detecting information concerning said displacement of said vibration mass caused by said Coriolis force in said direction along said second axis based on said difference between said electrostatic capacitance C1 and C2, adjusting respectively amplitudes of drive voltages V1 and V2 according to said information derived, and canceling said Coriolis force affecting to said vibration mass.

17. The angular velocity sensor of claim 15, further comprising:

drive controlling means for detecting information concerning said vibration amplitude of said vibration mass in said direction along said first axis based on said sum of said electrostatic capacitance C1 and C2, adjusting respectively said amplitudes of said drive voltages V1 and V2 according to said information derived, and holding said vibration amplitude of said vibration mass to be constant.

18. The angular velocity sensor of claim 15, wherein said drive voltages applied to said vibration mass are addition signals consisting of voltage varying at a first frequency with time and voltage varying at a second frequency higher than said first frequency with time, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively, then said electrostatic capacitance C1 and C2 are measured by detecting potentials on respective connection points between said reference electric capacitors $C_{ref}$ and said stationary drive electrodes in synchronism with said first frequency and said second frequency.

19. The angular velocity sensor of claim 16, wherein said drive voltages applied to said vibration mass are addition signals consisting of voltage varying at a first frequency with time and voltage varying at a second frequency higher than said first frequency with time, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively, then said electrostatic capacitance C1 and C2 are measured by detecting potentials on respective connection points between said reference electric capacitors $C_{ref}$ and said stationary drive electrodes in synchronism with said first frequency and said second frequency.

20. The angular velocity sensor of claim 17, wherein said drive voltages applied to said vibration mass are addition signals consisting of voltage varying at a first frequency with time and voltage varying at a second frequency higher than said first frequency with time, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively, then said electrostatic capacitance C1 and C2 are measured by detecting potentials on respective connection points between said reference electric capacitors $C_{ref}$ and said stationary drive electrodes in synchronism with said first frequency and said second frequency.

21. The angular velocity sensor of claim 15, wherein said drive voltages V1, V2 vary at a first frequency with time and has a first time period during when no drive voltage is applied but a read voltage $V_c$ is applied, and reference electric capacitors $C_{ref}$ are connected to said stationary drive electrodes constituting said at least two electrode pairs, respectively, and wherein said drive voltages V1, V2 are applied via said reference electric capacitors $C_{ref}$ respectively so that the read voltage $V_c$ is applied to said stationary drive electrodes, then said electrostatic capacitance C1 and C2 are measured by detecting potentials on respective connection points between said reference electric capacitors $C_{ref}$ and said stationary drive electrodes in synchronism with said read voltage.

22. The angular velocity sensor of claim 16, wherein said drive voltages applied to said vibration mass vary at a first frequency with time and has a first time period during when no drive voltage is applied but a read voltage is applied, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively so that the read voltage $V_c$ is applied to said stationary drive electrodes, then said electrostatic capacitance C1 and C2 are measured by detecting potentials on respective connection points between said reference electric capacitors $C_{ref}$ and said stationary drive electrodes in synchronism with said read voltage.

23. The angular velocity sensor of claim 17, wherein said drive voltages applied to said vibration mass vary at a first frequency with time and has a first time period during when no drive voltage is applied but a read voltage is applied, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively so that the read voltage $V_c$ is applied to said stationary drive electrodes, then said electrostatic capacitance C1 and C2 are measured by detecting potentials on respective connection points between said reference electric capacitors $C_{ref}$ and said stationary drive electrodes in synchronism with said read voltage.

24. The angular velocity sensor of claim 15, wherein said drive voltages applied to said vibration mass vary at a first frequency with time and has a first time period during when no drive voltage is applied, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively and a read voltage is applied to said vibration mass during said first time period, then said electrostatic capacitance C1 and C2 are measured by detecting potentials on respective connection points between said reference electric capacitors $C_{ref}$ and said stationary drive electrodes in synchronism with said read voltage.

25. The angular velocity sensor of claim 16, wherein said drive voltages applied to said vibration mass vary at a first frequency with time and has a first time period during when no drive voltage is applied, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively and a read voltage is applied to said vibration mass during said first time period, then said electrostatic capacitance C1 and C2 are measured by detecting potentials on respective connection points between said reference electric capacitors $C_{ref}$ and said stationary drive electrodes in synchronism with said read voltage.

26. The angular velocity sensor of claim 17, wherein said drive voltages applied to said vibration mass vary at a first frequency with time and has a first time period during when no drive voltage is applied, and reference electric capacitors $C_{ref}$ are connected to said stationary drive electrodes constituting said at least two electrode pairs, respectively, and wherein said drive voltages are applied to respective stationary drive electrodes via said reference electric capacitors $C_{ref}$ respectively and a read voltage is applied to said vibration mass during said first time period, then said electrostatic capacitance C1 and C2 are measured by detecting potentials on respective connection points between said reference electric capacitors $C_{ref}$ and said stationary drive electrodes in synchronism with said read voltage.

27. The angular velocity sensor of claim 1, wherein at least one of said stationary drive electrodes and said stationary detection electrodes have a structure which is fixed to said substrate at two locations or is fixed to said substrate, and further comprising a stopper for limiting a displacement of said vibration mass in a direction along said third axis.

28. The angular velocity sensor of claim 27, wherein said vibration mass includes a plurality of cavities in which at least one of said stationary drive electrodes and said stationary detection electrodes are provided, capacitors are formed by inner walls of said plurality of cavities and said stationary drive electrodes or said stationary detection electrodes opposing to said inner walls.

29. The angular velocity sensor of claim 27, wherein said stopper is a canopy-like structure fixed with the same structural body as said vibration mass.

30. The angular velocity sensor of claim 27, wherein said stopper is a canopy-like structure made of silicon nitride.

31. The angular velocity sensor of claim 29, wherein said stopper is a canopy-like structure made of polysilicon.

* * * * *